US012516400B2

(12) United States Patent
Wang et al.

(10) Patent No.: US 12,516,400 B2
(45) Date of Patent: Jan. 6, 2026

(54) MULTI-DIMENSIONAL LIGAND-ASSISTED CHROMATOGRAPHY METHOD FOR THE PURIFICATION OF RARE EARTH ELEMENTS AND OTHER METAL IONS FROM WASTE MAGNETS

(71) Applicants: Purdue Research Foundation, West Lafayette, IN (US); Nien-Hwa Linda Wang, West Lafayette, IN (US); David Harvey, West Lafayette, IN (US); Yi Ding, West Lafayette, IN (US)

(72) Inventors: Nien-Hwa Linda Wang, West Lafayette, IN (US); David Harvey, West Lafayette, IN (US); Yi Ding, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 671 days.

(21) Appl. No.: 17/797,826

(22) PCT Filed: Jan. 28, 2021

(86) PCT No.: PCT/US2021/015366
§ 371 (c)(1),
(2) Date: Aug. 5, 2022

(87) PCT Pub. No.: WO2021/173291
PCT Pub. Date: Sep. 2, 2021

(65) Prior Publication Data
US 2023/0093246 A1    Mar. 23, 2023

Related U.S. Application Data

(60) Provisional application No. 62/982,807, filed on Feb. 28, 2020.

(51) Int. Cl.
C22B 59/00 (2006.01)
B01D 15/18 (2006.01)
(Continued)

(52) U.S. Cl.
CPC .......... *C22B 59/00* (2013.01); *B01D 15/1878* (2013.01); *B01D 15/203* (2013.01);
(Continued)

(58) Field of Classification Search
None
See application file for complete search history.

(56) References Cited

U.S. PATENT DOCUMENTS

| | | | | |
|---|---|---|---|---|
| 2,897,050 A | * | 7/1959 | Jaffe | C22B 3/42 423/21.5 |
| 2015/0292060 A1 | * | 10/2015 | Laucournet | C22B 59/00 423/21.1 |

(Continued)

FOREIGN PATENT DOCUMENTS

| | | | |
|---|---|---|---|
| JP | 2017006099 | | 1/2017 |
| JP | 2017006099 A | * | 1/2017 |
| WO | 0047785 | | 8/2000 |

*Primary Examiner* — Keith D. Hendricks
*Assistant Examiner* — Nikolas Takuya Pullen
(74) *Attorney, Agent, or Firm* — Brannon Sowers & Cracraft PC

(57) ABSTRACT

A method of recovering substantially rare earth elements (REEs) from magnets, including first dissolving a magnet to yield a solution containing Nd, Pr, and Dy, and then equilibrating a first column with $Cu^{2+}$ solution to yield a first equilibrated column, introducing the solution to the first equilibrated column, and introducing a ligand solution to the first equilibrated column to establish three bands of different liquid compositions in the column, wherein the three bands comprise a Dy/Nd mixed band, a first pure Nd band, and a Nd/Pr mixed band. Next, sending the Dy/Nd mixed band to a second column containing a $Cu^{2+}$ solution and introducing (Continued)

a ligand solution to the second column to establish a pure Dy band and a second pure Nd band in the second column, and sending the Nd/Pr mixed band to a third column containing a Cu2+ solution and introducing a ligand solution to the third column to establish a third pure Nd band and a pure Pr band in the third column. Finally, eluting the respective pure Nd bands to recover Nd, eluting the pure Dy band to recover Dy, and eluting the pure Pr band to recover Pr.

9 Claims, 32 Drawing Sheets

(51) Int. Cl.
  *B01D 15/20* (2006.01)
  *B01D 15/38* (2006.01)
  *C22B 3/06* (2006.01)
  *C22B 3/42* (2006.01)
(52) U.S. Cl.
  CPC .......... *B01D 15/3828* (2013.01); *C22B 3/065* (2013.01); *C22B 3/42* (2013.01)

(56) References Cited

U.S. PATENT DOCUMENTS

| | | |
|---|---|---|
| 2017/0166993 A1* | 6/2017 | Wang .................. C22B 3/42 |
| 2018/0119251 A1 | 5/2018 | Fox et al. |
| 2020/0308668 A1 | 10/2020 | Wang et al. |
| 2020/0308670 A1 | 10/2020 | Daware et al. |

* cited by examiner

LAD
Loading ligand-chelated REE ions
High ligand affinity REE elutes first

LAD
Loading free REE ions
High ligand affinity REE elutes first

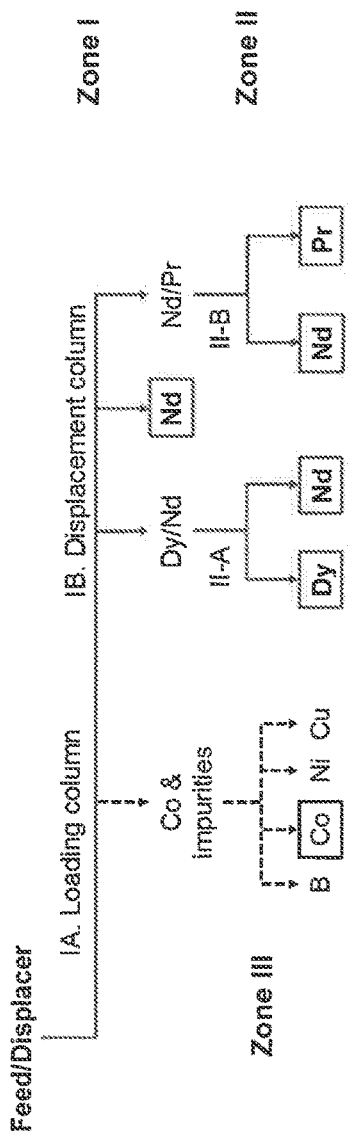
Fig. 19
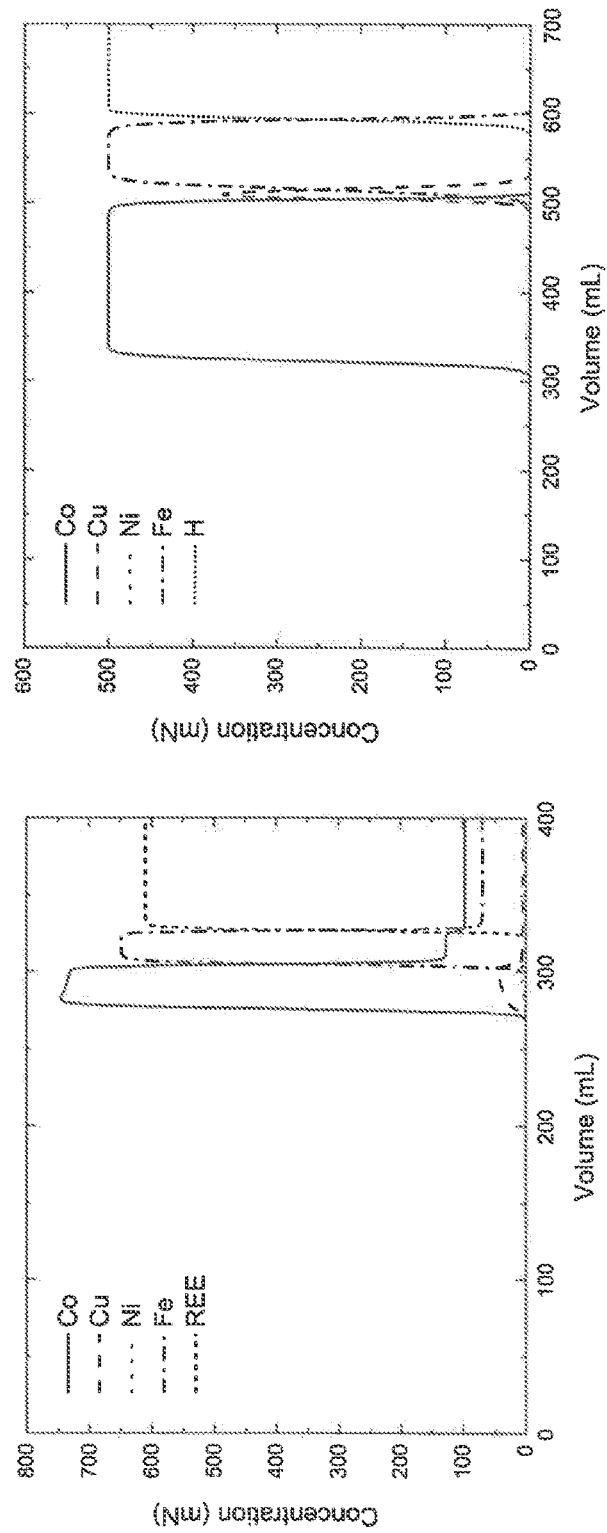
Fig. 20A
Fig. 20B $$X = L_f k_f^* \frac{\alpha^e - 1}{\alpha^e + 1}$$

MULTI-DIMENSIONAL LIGAND-ASSISTED CHROMATOGRAPHY METHOD FOR THE PURIFICATION OF RARE EARTH ELEMENTS AND OTHER METAL IONS FROM WASTE MAGNETS

CROSS-REFERENCE TO RELATED APPLICATIONS

This patent application claims priority to co-pending U.S. provisional patent application Ser. No. 62/982,807, filed on Feb. 28, 2020.

GOVERNMENT FUNDING

This invention was made with government support under SP8000-18-P-0007 awarded by the Defense Logistics Agency. The government has certain rights in the invention.

TECHNICAL FIELD

The present novel technology relates generally to the field of chemical engineering, and, more particularly, to a method of recovering the rare earth elements Nd, Pr, and/or Dy from waste materials

BACKGROUND

Rare earth elements (REEs) are valuable for high-tech and clean energy industries. Three REEs, Pr, Nd, and Dy, are useful ingredients for magnets, which are widely used in electronics, automobile, and the wind energy industry, among others. The supply chain of REEs in general, and Pr, Nd, and Dy in particular, is at risk because the production of REEs is highly concentrated in a few countries.

Once produced and used, waste magnets are almost universally consigned to landfills. Such disposal of REEs in landfills represents a recoverable local source of REEs, but for a lack of efficient recovery mechanism. Thus, there remains a need for developing an alternate supply stream of REEs in general and Nd, Pr, and Dy in particular. The present novel technology addresses this need.

SUMMARY

Three rare earth elements (REEs), neodymium (Nd), praseodymium (Pr), and dysprosium (Dy), are essential ingredients of permanent magnets, used widely in electronics, motors, hybrid cars, generators, televisions, sensors, windmills, and the like. Conventional methods for producing high-purity REEs employ two-phase liquid-liquid extraction methods, which require thousands of mixer-settler units arrayed in series or in parallel and generate large amounts of toxic wastes.

The present novel technology relates to a novel ligand-based chromatography (LBC) zone-splitting method developed for producing high-purity (>99%) Nd, Pr, and Dy with high yields (>99%) and high sorbent productivity from crude REE mixtures derived from waste magnets. Ligands with selectivity for REEs may be added in the mobile phase to enable ligand assisted displacement (LAD) wherein the REEs are recovered during an ligand-assisted elution (LAE) step, or the ligands may be immobilized on a stationary phase to enable a ligand-bound displacement (LBD) with a continuous elution mode (LB-SMB).

Ligands with affinity for one or more REEs include citric acid, aminopolycarboxylic acids (such as ethylenediaminetetraacetic acid (EDTA), diethylenetriaminepentaacetic acid (DTPA), nitrilotriacetic acid (NTA), and the like), bicine, and the like, as well as other REE selective extractants such as HDEHP, DGA, and the like, and combinations thereof.

The new method introduces a two-zone ligand-assisted displacement chromatography (LAD) system with an improved correlation for predicting the minimum column length to reach a constant-pattern state in LAD. The zone-splitting method based on selectivity-weighted composition factors enables a two-zone design to achieve two orders of magnitude higher productivity than that of a single column design. The design and simulation methods are based on first principles and intrinsic (or scale-independent) engineering parameters. They can be used to design processes for a wide range of feed compositions or production scales. The overall productivity of the two-zone LAD can exceed 100 kg REEs/m3/day, which is 100 times higher than those of the conventional extraction methods.

In the case of LAD, sorbents include microporous, sulfonic acid, aminophosphonic acid functional groups, and the like. For LBD, sorbents IDA resin has a high selectivity for Cu, Ni, Co but low selectivity for REEs; porous silica with bound EDTA, DTPA, and/or phosphate ligands, DGA bound on PMMA, and EDTA bound on PS or polymeric resins with amine functional groups.

The LAD and/or LBD for the purification of the ternary mixture requires only three chromatography columns, a safe extractant, EDTA, and other environmentally friendly chemicals. Most of the chemicals can be recycled, generating little waste. This method has the potential for efficient and environmentally friendly purification of the REEs from waste magnets. The method may also help transform the current linear REE economy (from ores to pure REEs, to products, to landfills) to a circular and sustainable REEs economy.

| LAD vs. LBD | | |
|---|---|---|
| | Ligand assisted displacement (LAD) | Ligand based displacement (LBD) |
| Sorbent | Cation exchange resin (available commercially) | Ligand that is selective for REEs or other metal ions is immobilized on a sorbent |
| Presaturant | High ligand affinity species (Cu) | Low affinity species for the immobilized ligand (Na+) |
| Displacer | Ligand solution (EDTA) | High affinity species for the immobilized ligand (H+) |
| Elution sequence | High ligand affinity species in the feedstock elutes first | Low ligand affinity species in the feedstock elutes first |
| Regeneration | Sorbent and ligand are regenerated separately | Sorbent and ligand are re-generated simultaneously |

DESCRIPTION OF THE DRAWINGS

FIG. 19 illustrates elution time as a function of concentration for the breakthrough cut 8 for collecting products from the column effluent in LAD.

FIGS. 20A-20B illustrate impurities from the adjacent component.

DETAILED DESCRIPTION

Figure 1:
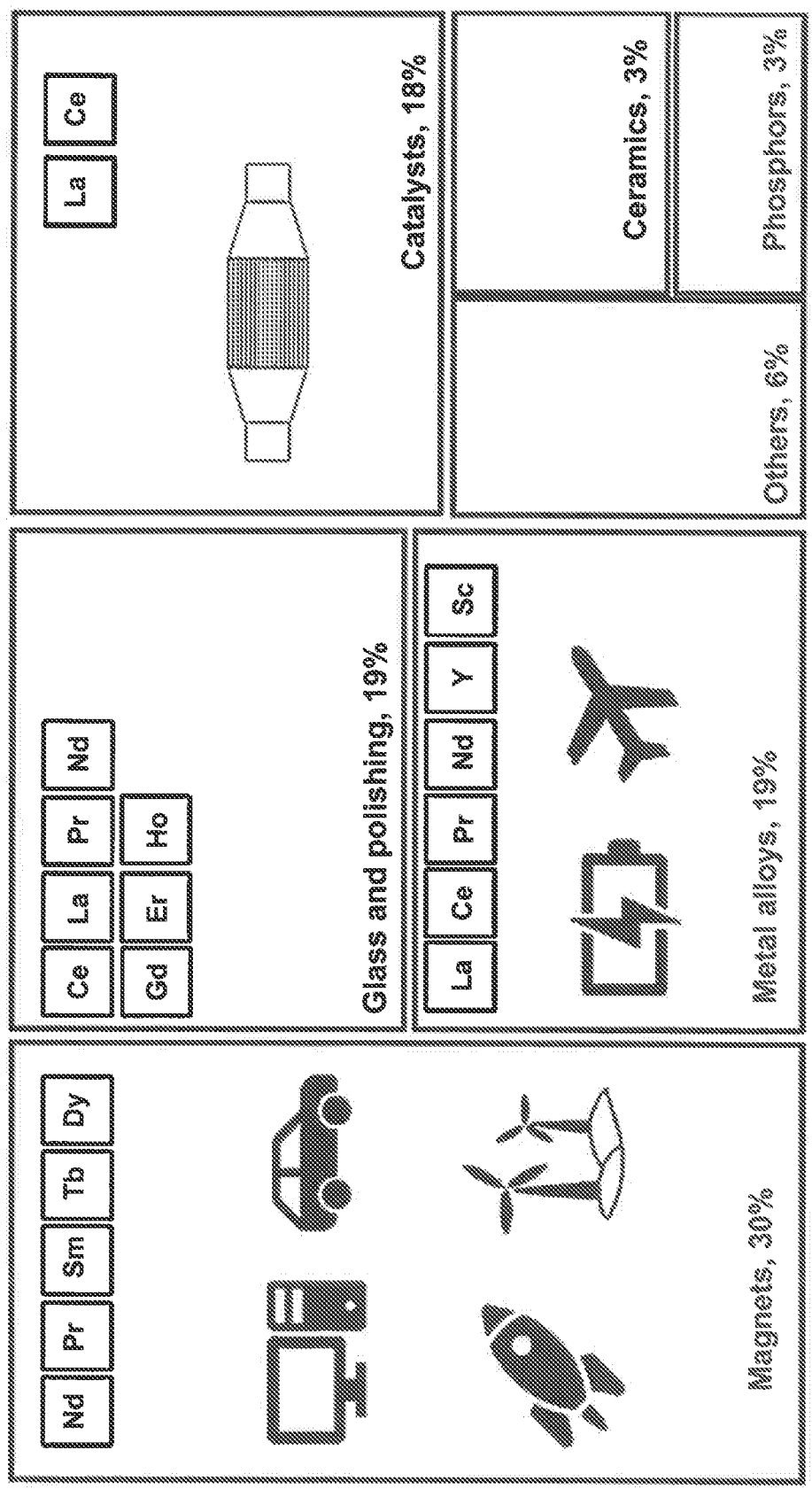
FIG. 1 is a graphical illustration of the breakdown of REEs (by weight) in different applications.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Rare earth elements (REEs) include the 15 elements in the lanthanide series plus scandium (Sc) and yttrium (Y). They are in demand for use in magnets, metal alloys, polishing powders, catalysts, ceramics, phosphors, and the like, which are important for high-technology and clean energy applications. Although the total market value of REEs is only $1.5 billion, the market value of the products that require REEs exceeds $5 trillion.

About 30 wt. % of rare earth elements are used to produce NdFeB permanent magnets, which are widely used in hard drive disks, wind turbine generators, and electric vehicle motors. Three REEs commonly found in NdFeB magnets are Nd, Dy, and Pr. The first two are classified as critical materials by the U.S. Department of Energy, which aims at generating 20% of the electricity from wind energy by 2030. Each direct-drive permanent generator for 1 MW of electricity will require between 160 to 650 kg of permanent magnets made from Nd, Pr, and Dy. Such generators are increasingly used in offshore and large onshore installations because of their high energy efficiency. Rare earth permanent magnets are also used in the motors of the hybrid and electric vehicles. It is estimated that each hybrid or electric vehicle requires 1.5 to 2.5 kg of REE-based permanent magnets.

The market of the key REEs in magnets is highly volatile because their production is concentrated in a few regions around the world. China now controls over 80% of the world REEs supplies and more than 95% of the supplies of rare earth alloys and magnets. This control could lead to manufacturing of over 90% of the high-tech products in China by 2040. The REE production in other regions is limited by a lack of technical expertise in production, high capital costs, and the significant environmental impacts of the conventional methods.

Production of REEs starts from the beneficiation and concentration of REE ores such as bastnasite, a rare earth fluorocarbonate salt containing about 7-8% of rare earth oxide (REO) equivalent. After crushing and grinding, chemical steam conditioning, flotation, and cleaning, bastnasite can be upgraded to a concentrated REE crude that contains about 60% REO. The REE crude is further digested, purified, and refined to pure metals.

The REE purification process is the most difficult step because the REEs present in the crude have similar physical and chemical properties. Current industrial purification procedures still use liquid-liquid extraction methods developed in the 1950s. Such methods require thousands of mixer-settler units to produce high-purity REEs. It is difficult to adapt the liquid-liquid extraction methods to different feedstocks or production scales. These methods are energetically and chemically intensive, requiring the use of toxic extractants, organic solvents, concentrated acids for stripping, and generating large amounts of acidic and toxic wastes. To produce one ton of rare earth oxides, about 30 tons of wastewater are released into the environment. The extraction processes also consume large amounts of ammonia for the saponification of the organophosphorus extractant, as well as a large volume of hydrochloric acid for stripping of the extractant. On average only 35% of the ammonia used in the process is recovered as ammonium chloride. Life cycle analysis studies reveal that in the production of REEs from bastnasite, the purification steps in the conventional processes account for about ⅓ of the total environmental impact in terms of global warming, carcinogen and non-carcinogen human toxicity, eutrophication, and ecotoxicity. Furthermore, they contribute 70% of the ozone depletion impact in the production process.

Recycling waste magnets is a viable method for producing valuable REEs materials. About 300,000 tons of REEs are present in permanent magnets produced to date, and about 3,300 to 6,600 tons of REEs can be recovered per year from waste magnets. As solid-state disks (SSD) start to dominate the market, many HDDs containing REEs are projected to be available for recycling. Purified REEs derived from waste magnets can be reused in other energy and defense applications.

Recycling REEs from waste streams, such as waste magnets, can reduce the environmental risks associated with mining. Producing heavy rare earth oxides from clays containing adsorbed REE ions can cause underground water contamination and severe vegetation and topsoil removal. Large amounts of mine tailings and wastewater discharge into the environment may lead to permanent damage to ecosystems, loss of biodiversity, and human health issues.

The recovery of REEs from waste magnets is potentially profitable based on the Sherwood analysis, which gives an order of magnitude predictions of the price, or the production cost, as a function of the concentration of the target product in the feedstock. In general, the higher the concentration, the lower the production cost, and hence the market price. A Sherwood correlation line was obtained by fitting the prices of 10 metals and their weight fractions in mineral ores. Estimated feedstock cost and purification costs of Nd, Pr, and Dy from waste magnets are summarized in Table 1. The Sherwood analysis shows that waste magnets are promising feedstocks for producing Dy, Nd, and Pr, with a potential profit about $5/kg waste magnets.

TABLE 1

Feedstock costs, processing costs, and potential profits of producing Dy, Nd, and Pr from waste magnets

|    | Weight Percent (%) | Estimated Production Cost ($/kg REE) | Feedstock Costs ($/kg REE) | Market Price ($/kg REE) |
|----|---|---|---|---|
| Nd | 27  | 1  | 28.1 | 52  |
| Pr | 4.0 | 6  | 4.1  | 93  |
| Dy | 1.5 | 15 | 1.7  | 298 |

| REEs Revenue ($/kg feedstock) | Average Production Cost ($/kg feedstock) | Feedstock Costs ($/kg feedstock) | Profit ($/kg feed) |
|---|---|---|---|
| 22.2 | 6 ± 2 | 11* | 5 |

Various methods have been developed for recovering crude REE mixtures from waste magnets. The most commonly used method is oxidation of the metals to yield metal oxides, followed by selective acid leaching. The waste magnets were ground into fine particles and oxidized at elevated temperatures. Then the metal oxides were dissolved in acids. Other metal oxides (Fe, Ni, Co, B) were also removed via selective leaching or precipitation, membrane-assisted solvent extraction, or ionic liquid extraction. The REEs in the waste magnets can also be converted to soluble chloride salts by various methods, including roasting with ammonium chloride under inert atmosphere, chlorination using chlorine gas, or selective extraction using magnesium and potassium chlorides molten salts. Other methods have also been tested for converting REEs in waste magnets into hydroxides, including hydrothermal treatment and hydrolysis after vacuum induction melting. With most of the prior art recovery methods, more than 90% of the REEs in the waste magnets can be extracted as mixtures of REE chlorides or hydroxides with little contamination of the other elements in the waste magnets.

Separating the crude REE mixtures derived from waste magnets into pure individual REEs is helpful for producing metal alloys or other applications. Solvent extraction using an organophosphorus extractant in an ionic liquid was tested previously. However, only two REEs (Nd and Dy) were recovered with high purity, and the liquid-liquid extraction methods are inefficient for REE purification because the interfacial areas per unit processing volume for mass transfer are two to three orders of magnitude lower than those in adsorption or chromatography. A functionalized silica adsorbent was tested for separating Dy from other REEs derived from waste magnets, but the adsorbent was costly and had limited stabilities, and the Dy purity was low (~70%).

Since conventional low-cost adsorbents or ion exchangers have insufficient selectivities for REE purification, a chelating agent (or a ligand) in the mobile phase can be used to substantially increase the selectivity. The feasibility of ligand-assisted displacement chromatography for REE purification was first reported in the 1950s. Nonetheless, since no process simulations or systematic design methods were available, the literature LAD separation processes were designed empirically. Some experiments for separation of three REEs took several months. Hence, it is infeasible to use empirical methods for developing efficient LADs for large scale separation of REEs.

It is known that if the column length is sufficiently long, a constant-pattern displacement train can form in non-ideal LAD systems (i.e. systems with diffusion or dispersion effects). A general correlation to enable designs of LAD systems with the minimum column lengths to reach constant-pattern states, in which high purity bands with sharp boundaries form as a result of displacement effects. Operating at constant-pattern states can help achieve high purity products with high yields and high sorbent productivities. A constant-pattern design method was developed for non-ideal systems based on the general correlation and an equation for the yield of the target component. The yield is a function of several key dimensionless groups, which control the constant-pattern mass transfer zone length. The design method was tested and verified using simulations and experiments for different target yields, ligand concentrations, and feed compositions. The productivities achieved using this design method for a single column were over 800 times higher than prior art results for ternary separations with the same purity and similar yields.

The general correlation was derived from rate model simulations based on the constant separation factor (CSF) isotherm model, which is applicable to REE feed mixtures containing a ligand. If an REE feed mixture contains no ligand, the feed REEs will not separate in the loading zone, since most adsorbents have negligible selectivities for different REEs. The REE separation will occur only after a ligand is introduced after loading. For such cases, the loading zones are shorter, and higher loading velocities can be used to shorten the loading times. An improved isotherm model and simulations are presented here to simulate the separation processes more closely for REE crudes with no ligand, and a revised general correlation for the conditions required for reaching the constant-pattern state has been developed.

The prior art has been focused on the separation of equimolar ternary REE mixtures. However, the REE concentrations in the feedstock derived from waste magnets differ by one order of magnitude (Table 1). Achieving high yields of high-purity Dy (the minority component) in a single column requires an extremely narrow mass transfer zones between the two adjacent elution bands, and a small linear velocity for fixed selectivities and mass transfer coefficients. The overall elution time is long because of the small linear velocity, resulting in a low productivity. To address these shortcomings, the instant novel technology introduces a design involving more than one column, or one zone. An efficient splitting strategy is developed for the separation of complex feed mixtures to obtain high-purity REEs with high yields and high productivities.

Figure 2:
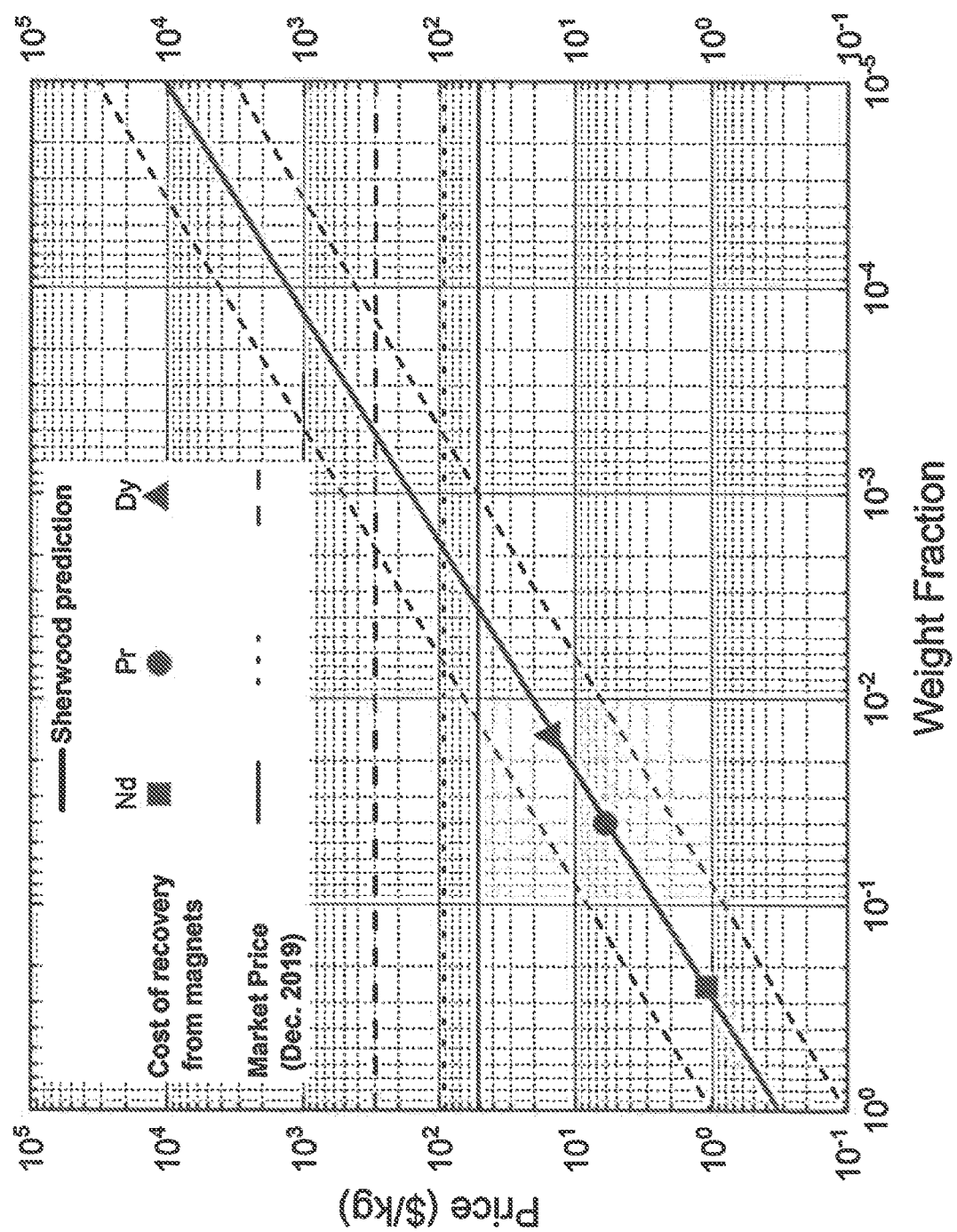
FIG. 2 is a charting of the Sherwood prediction on process costs for purifying REEs from magnets.
Figure 3:
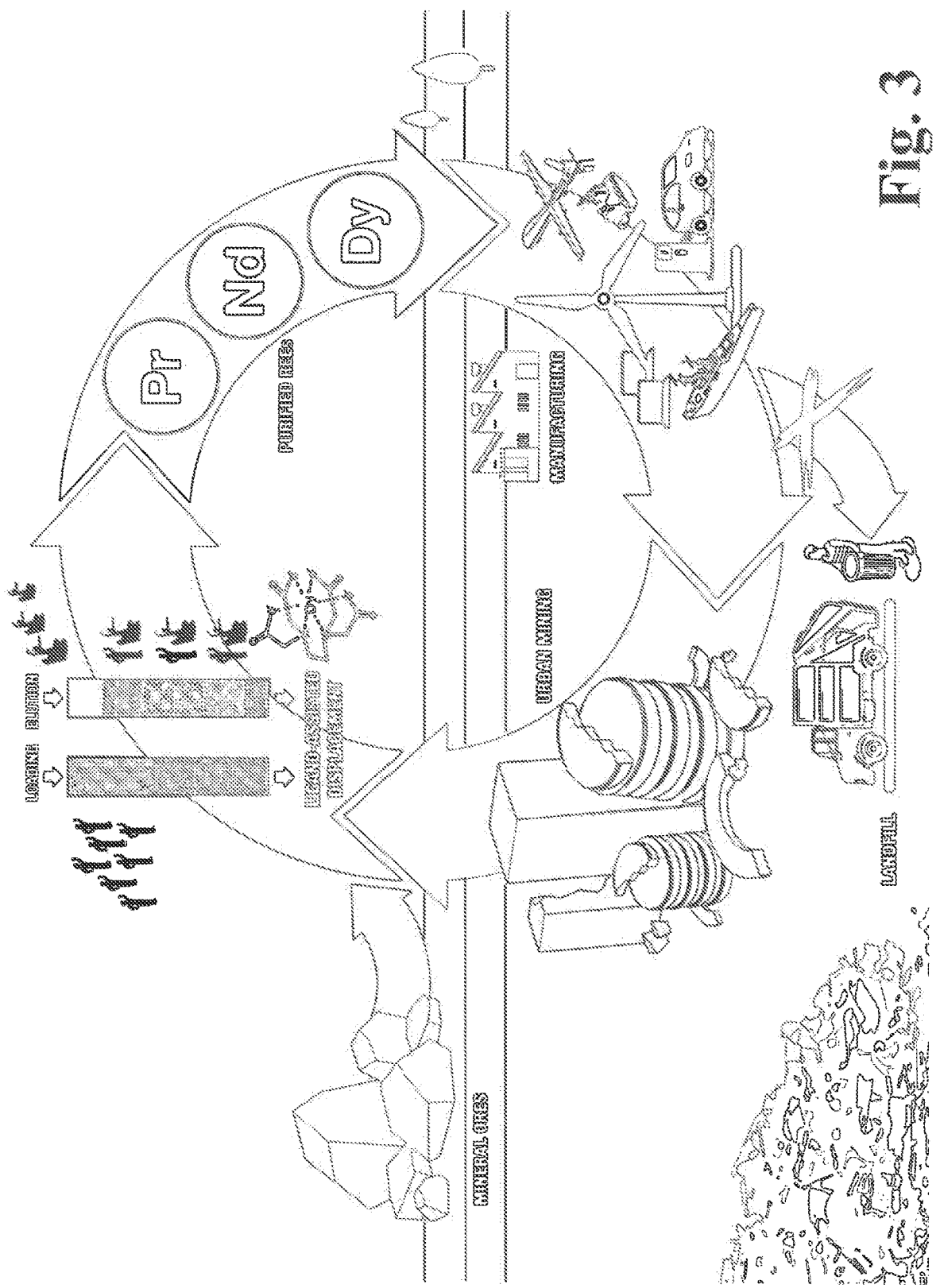
FIG. 3 graphically illustrates the supply chain for REE magnets as impacted by the present novel technology.
Figure 4:
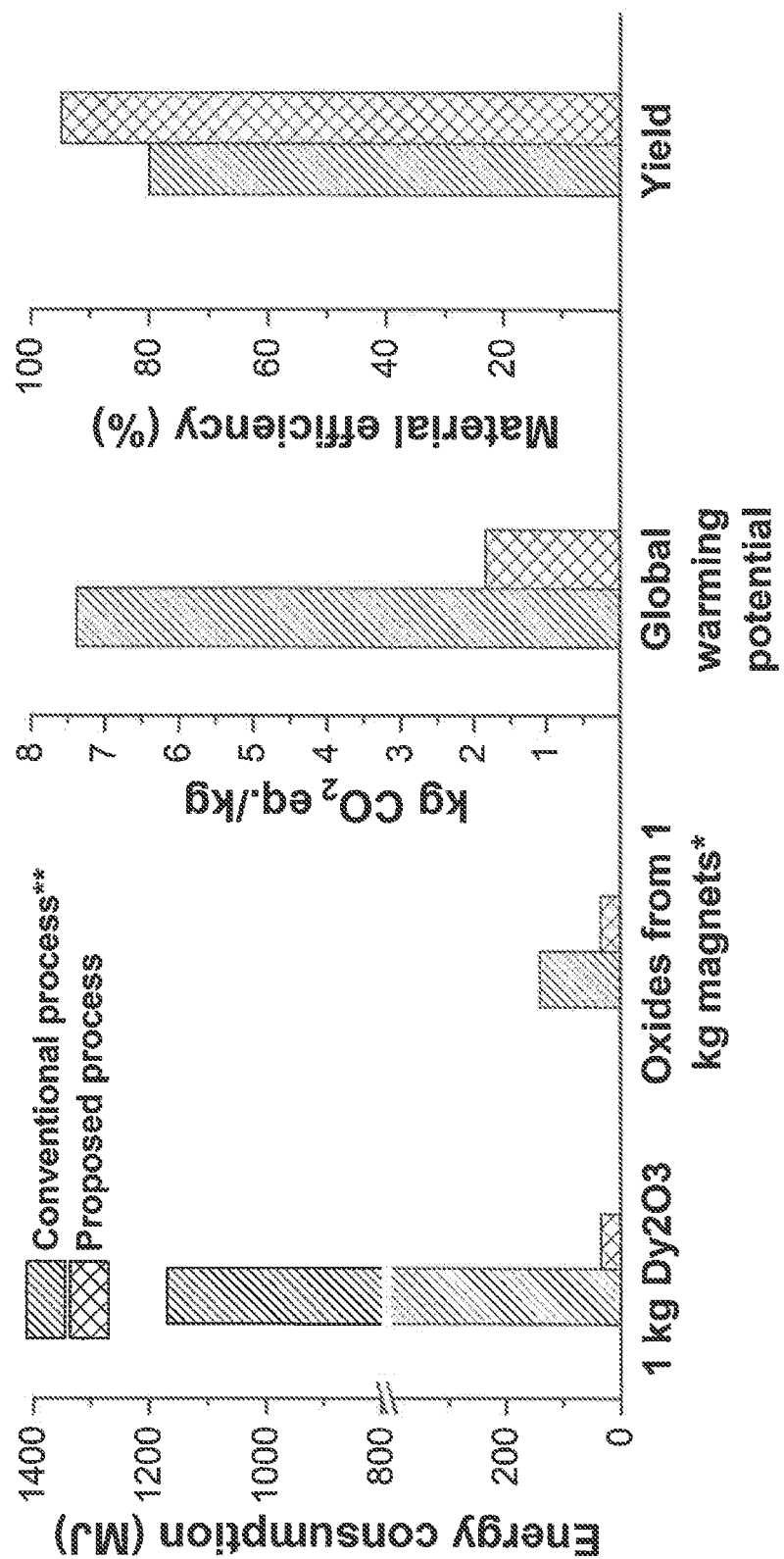
FIG. 4 graphically illustrates price as a function of weight fraction for the REEs Nd, Pr, and Dy.
Figure 5B:
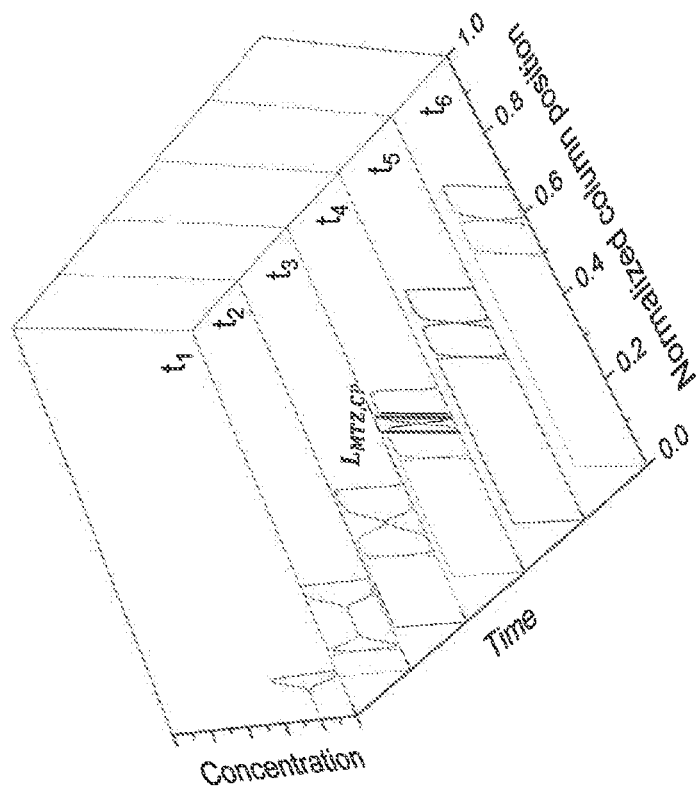
FIGS. 5A-5C chart the yield of REE recovery comparing the known methods to the novel technology.
Figure 5A:
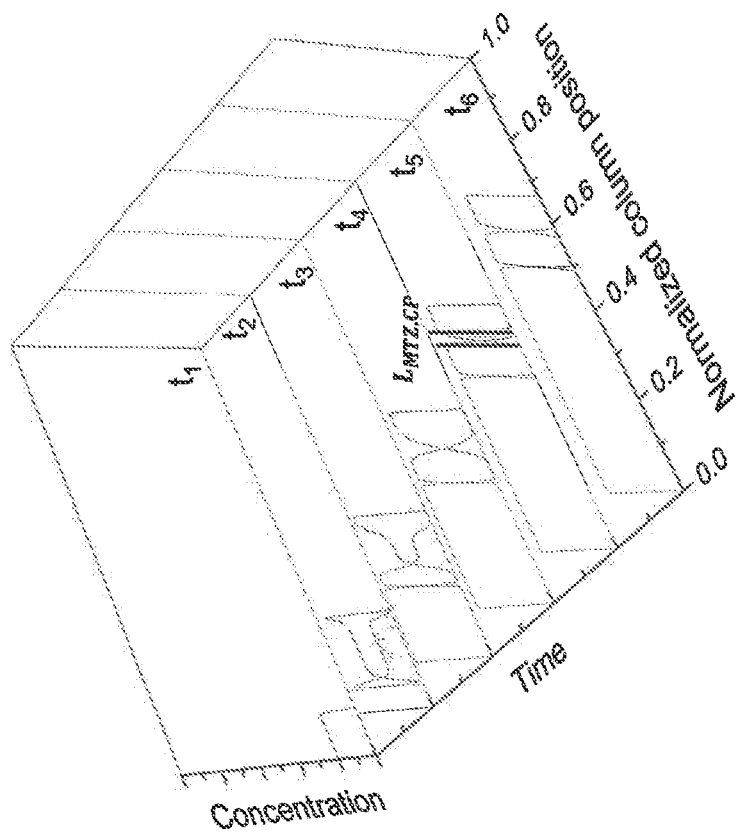
Figure 5C:
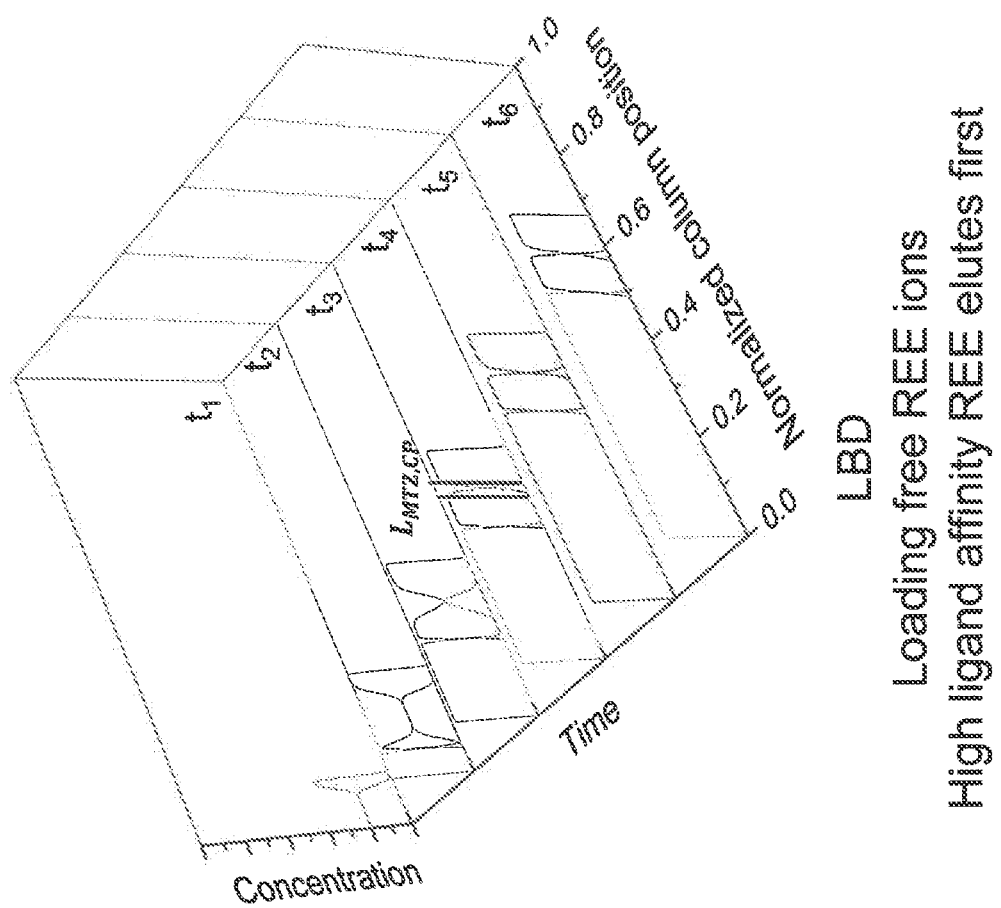
Figure 6:
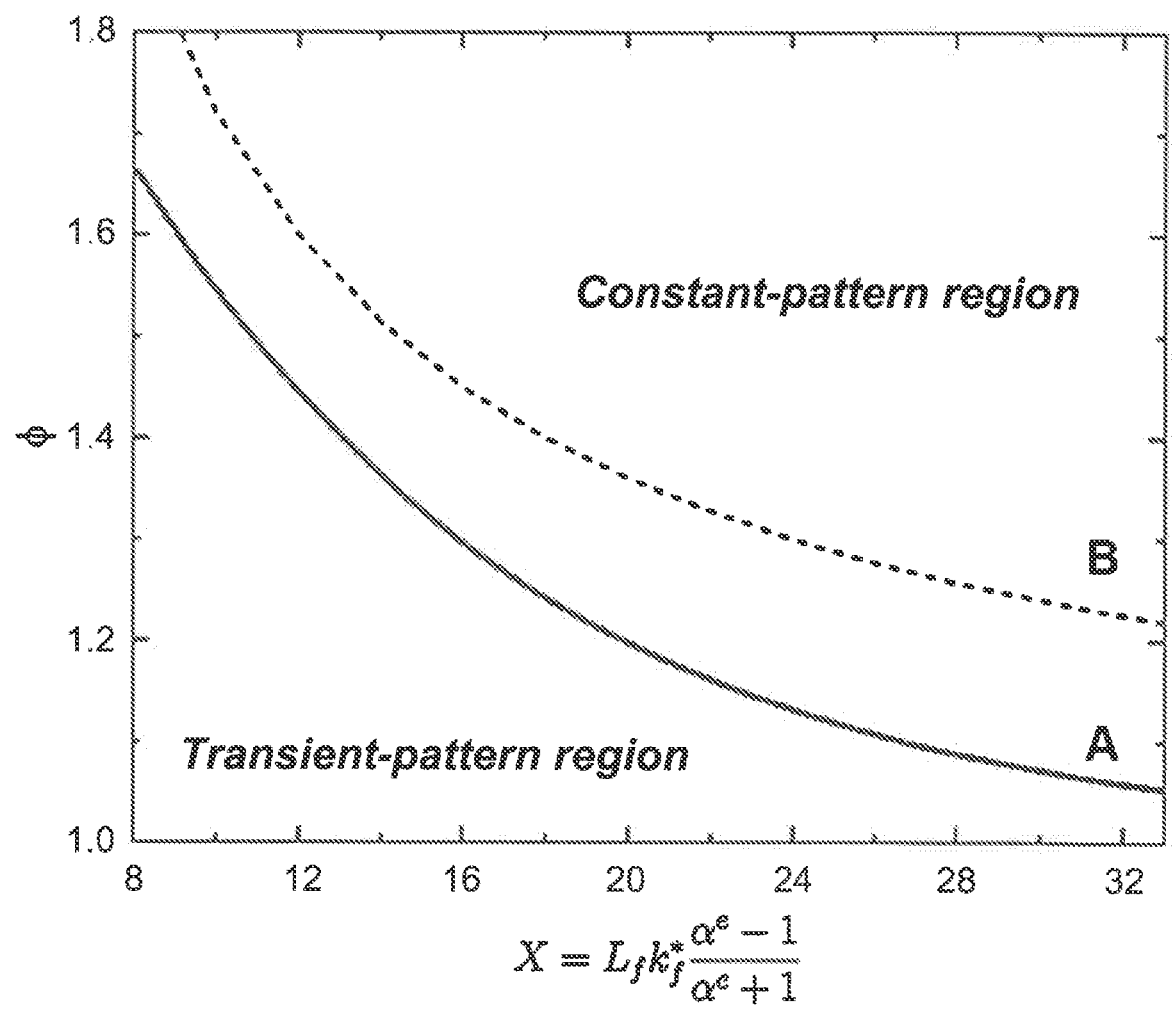
FIG. 6 graphically illustrate LAD with loading free ions, REE with highest affinity elutes first, LAD loading ligand-chelated REE ions, REE with high ligand affinity elutes first, and LBD loading free REE ions, REE with lowest ligand affinity elutes first.
Figure 7:
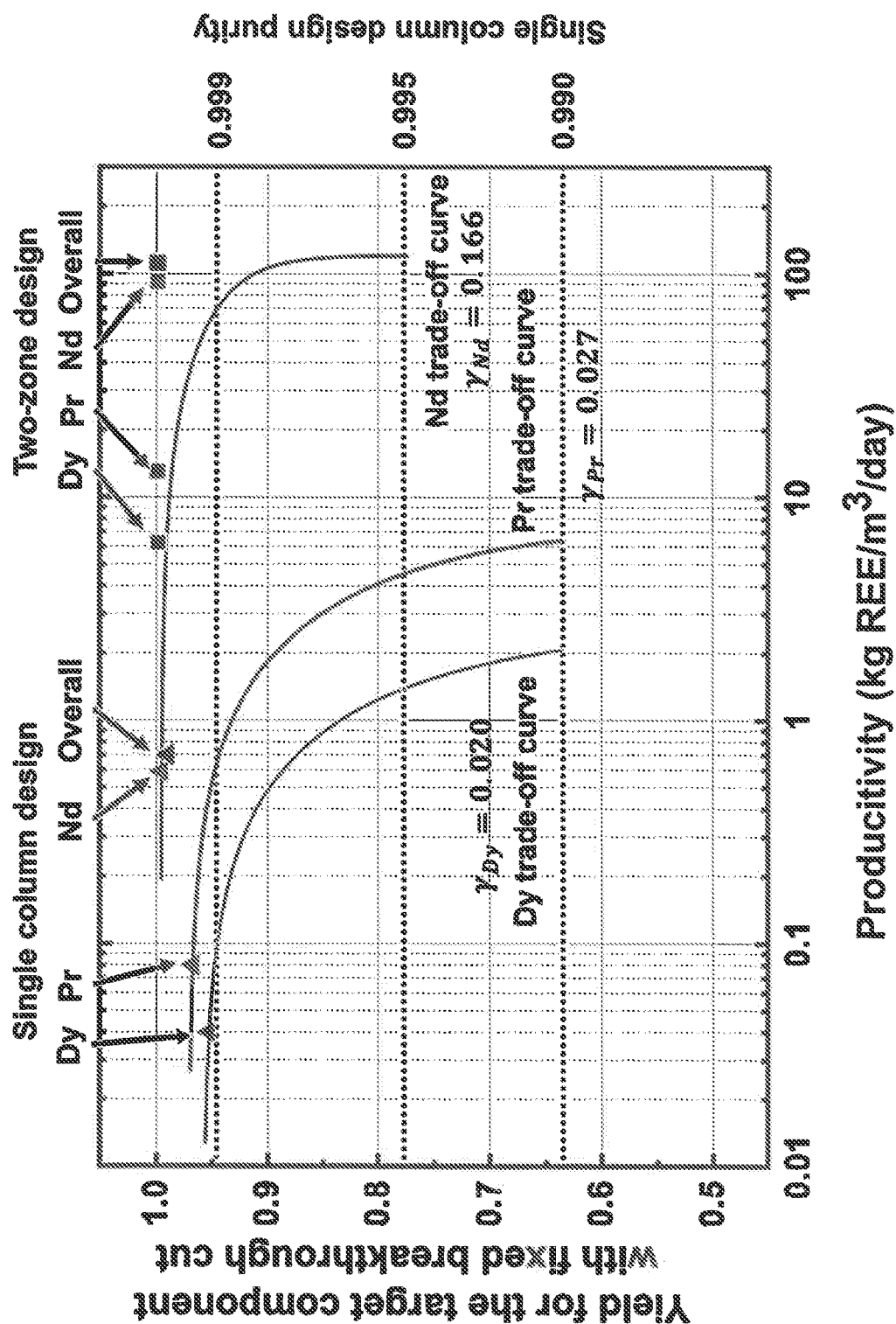
FIG. 7 graphically illustrates a constant-pattern general map for LCD recovery of REEs.
Figure 8A:
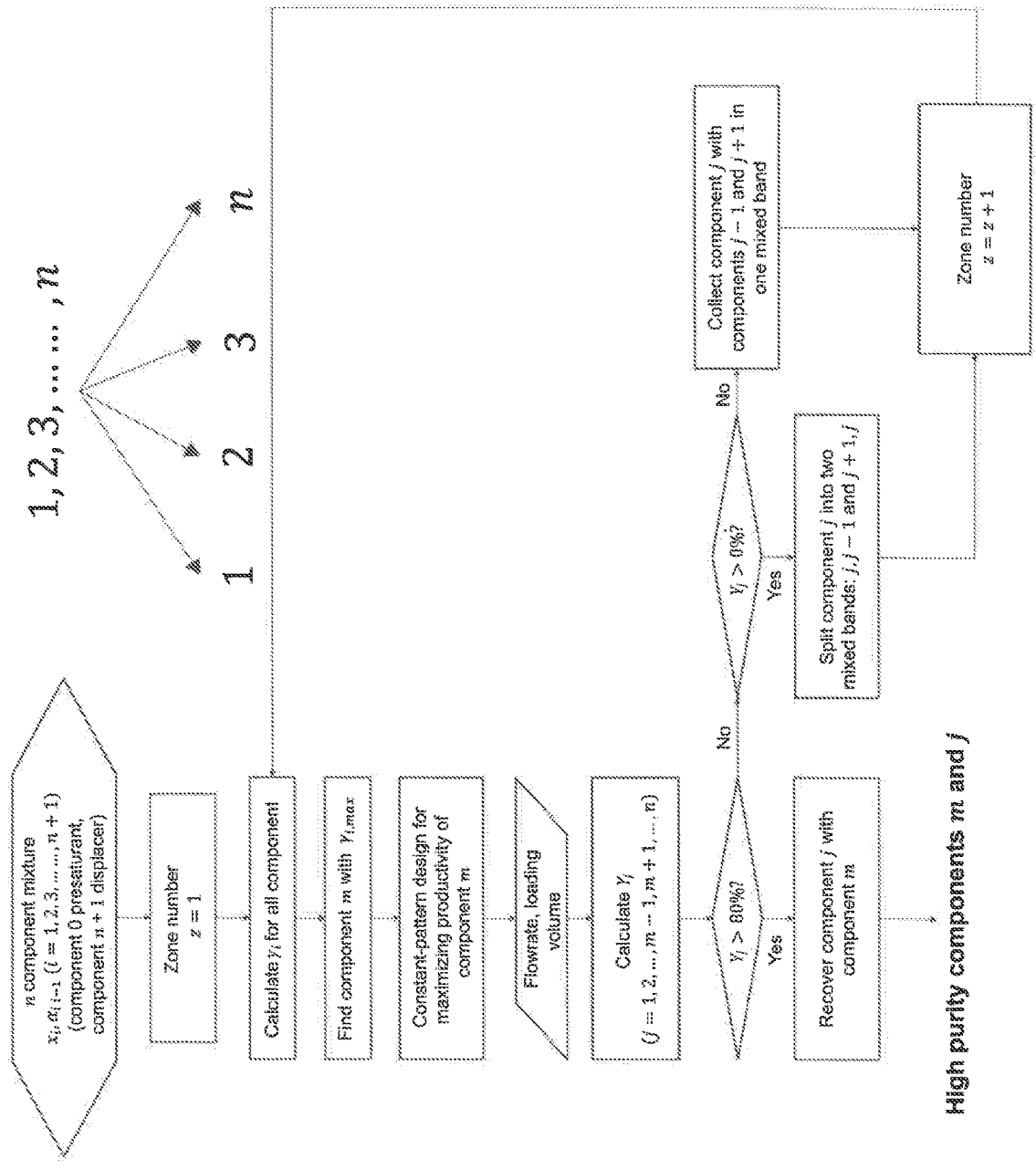
FIGS. 8A-D graphically illustrate productivity vs. yield for REE recovery for a constant pattern LAD deign for producing 99% pure products from the chosen ternary complex REE mixture using a single column with a fixed breakthrough cut (θ=0.05).
Figure 8B:
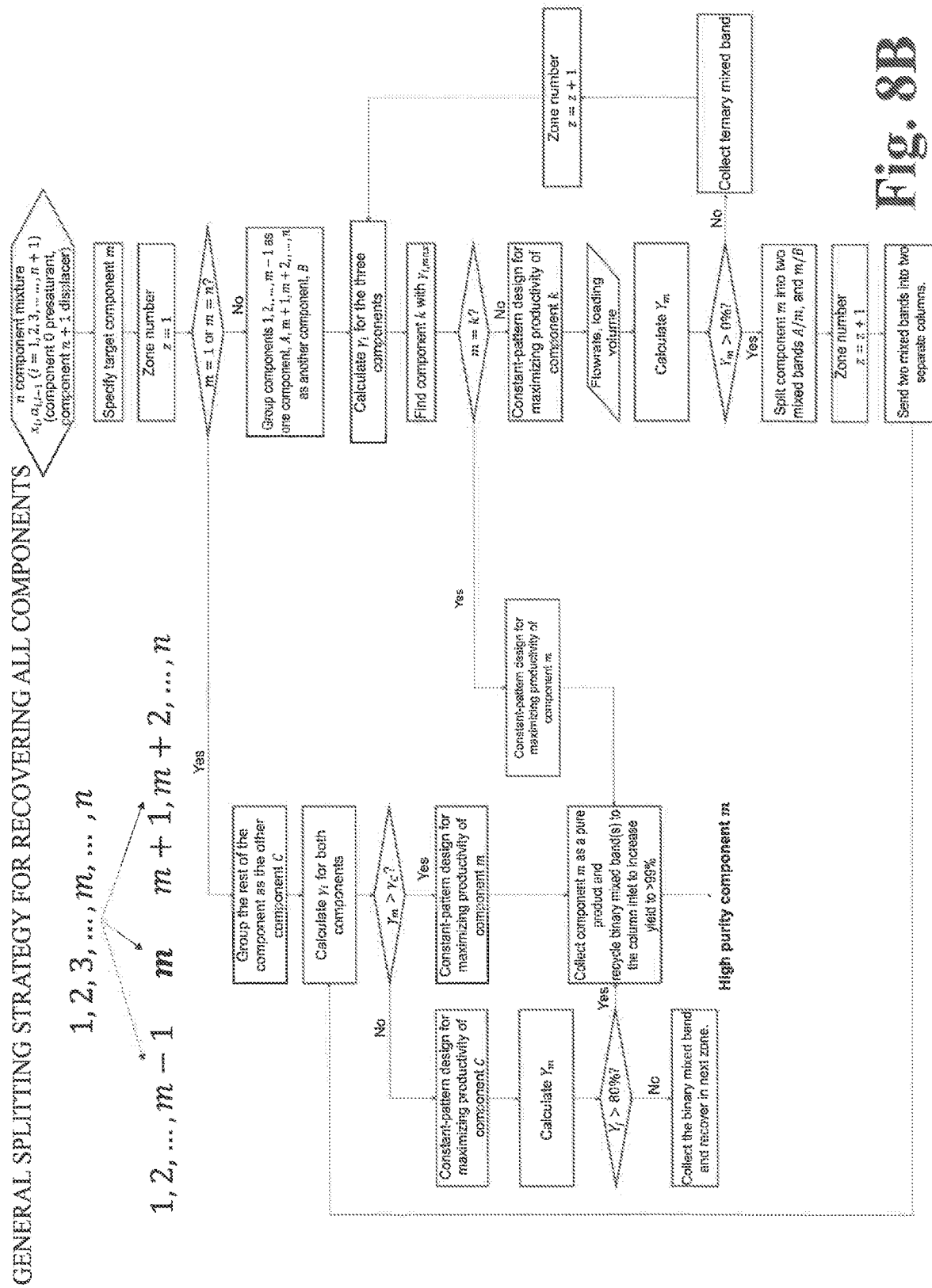
Figure 8C:
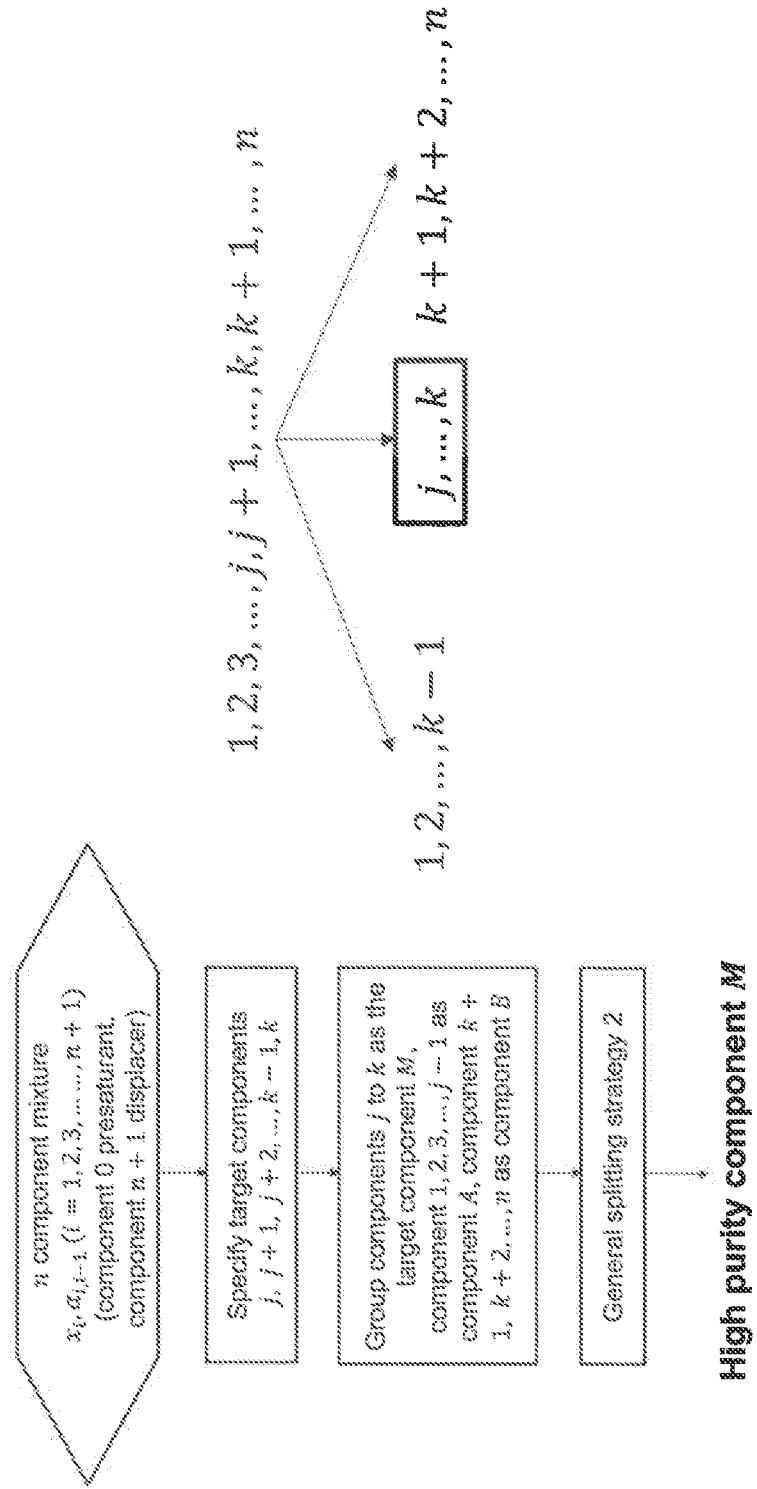
Figure 8D:
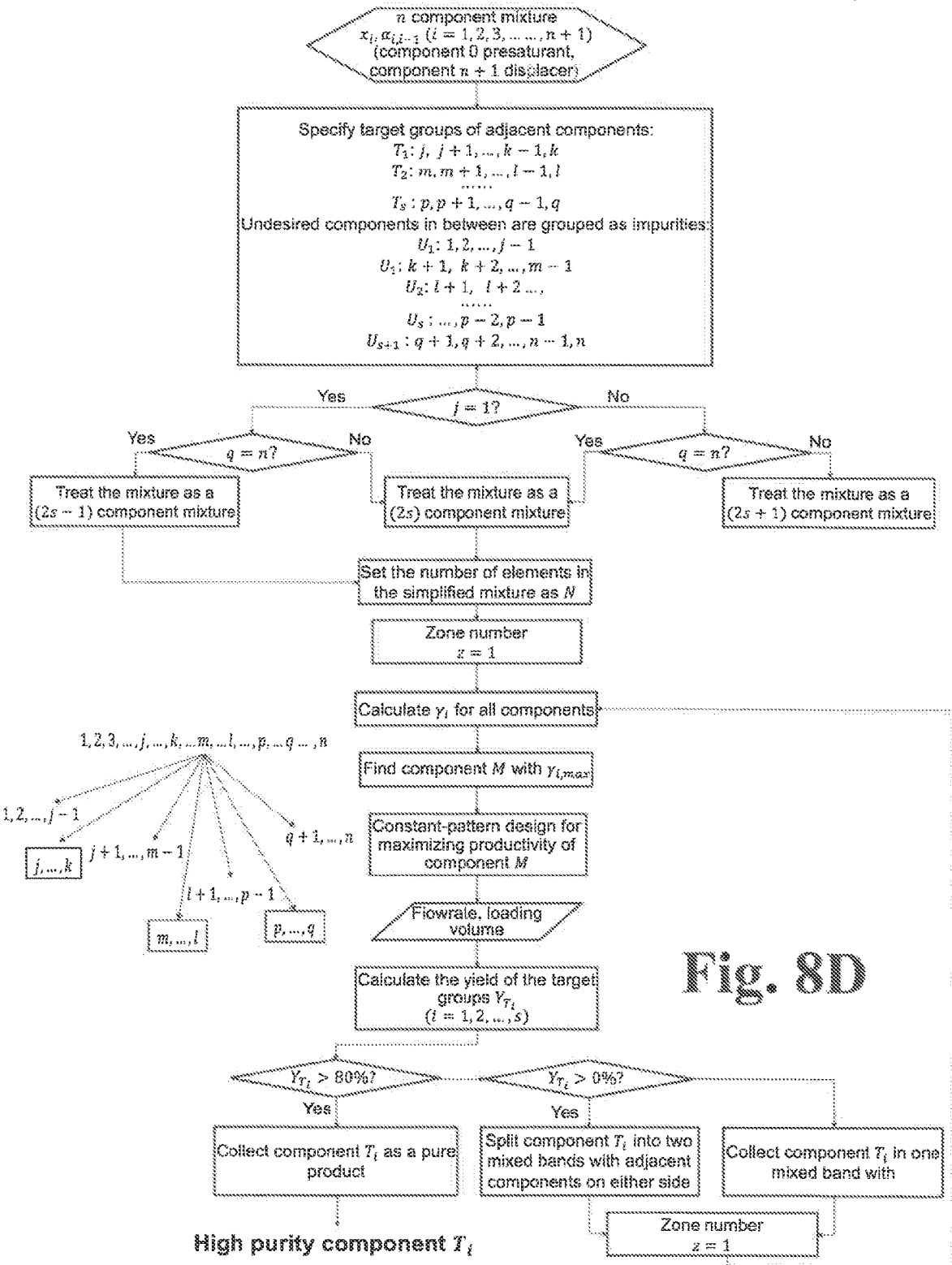
Figure 9:
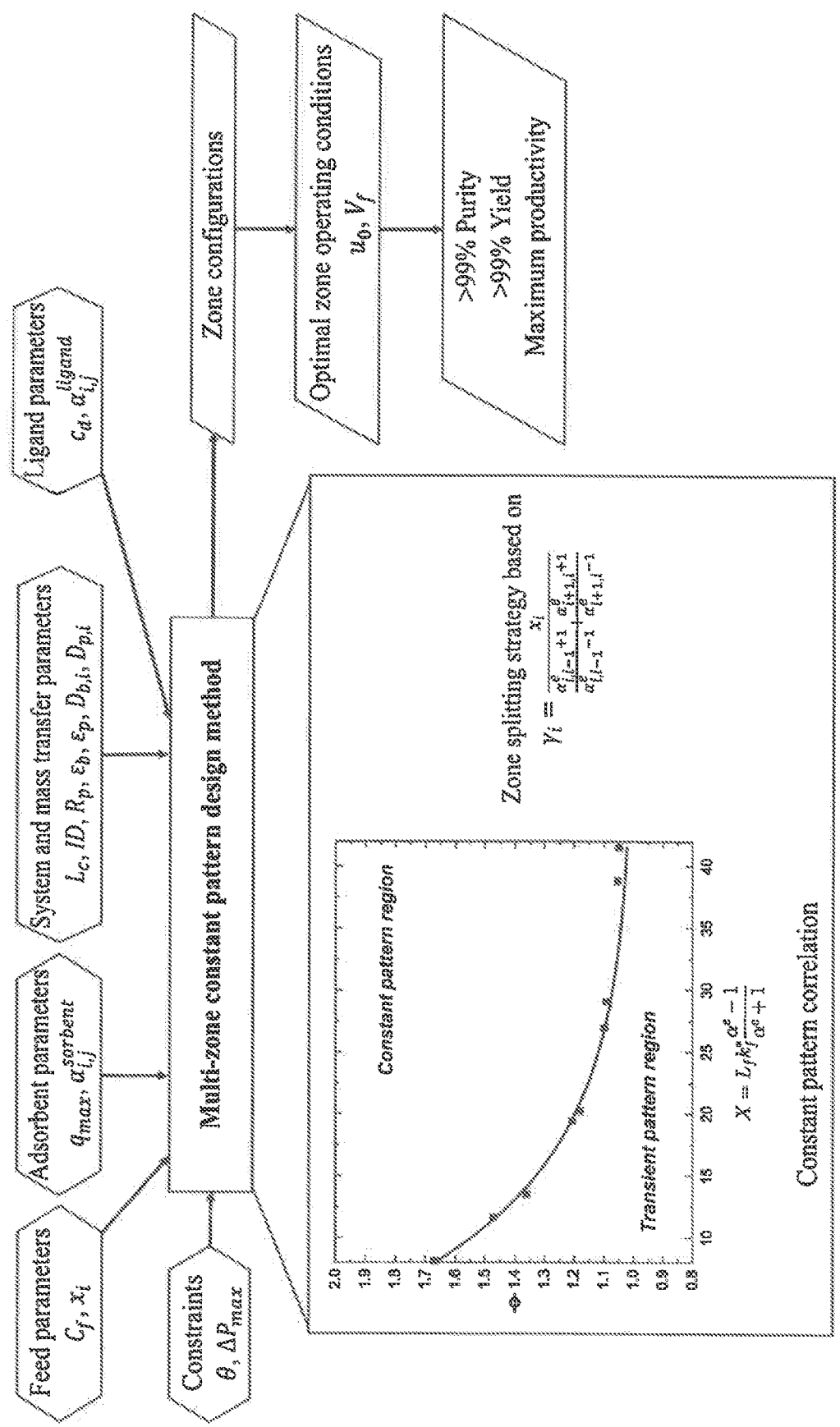
FIG. 9 schematically illustrates an overview of the novel multi-zone constant pattern design method.
Figure 10:
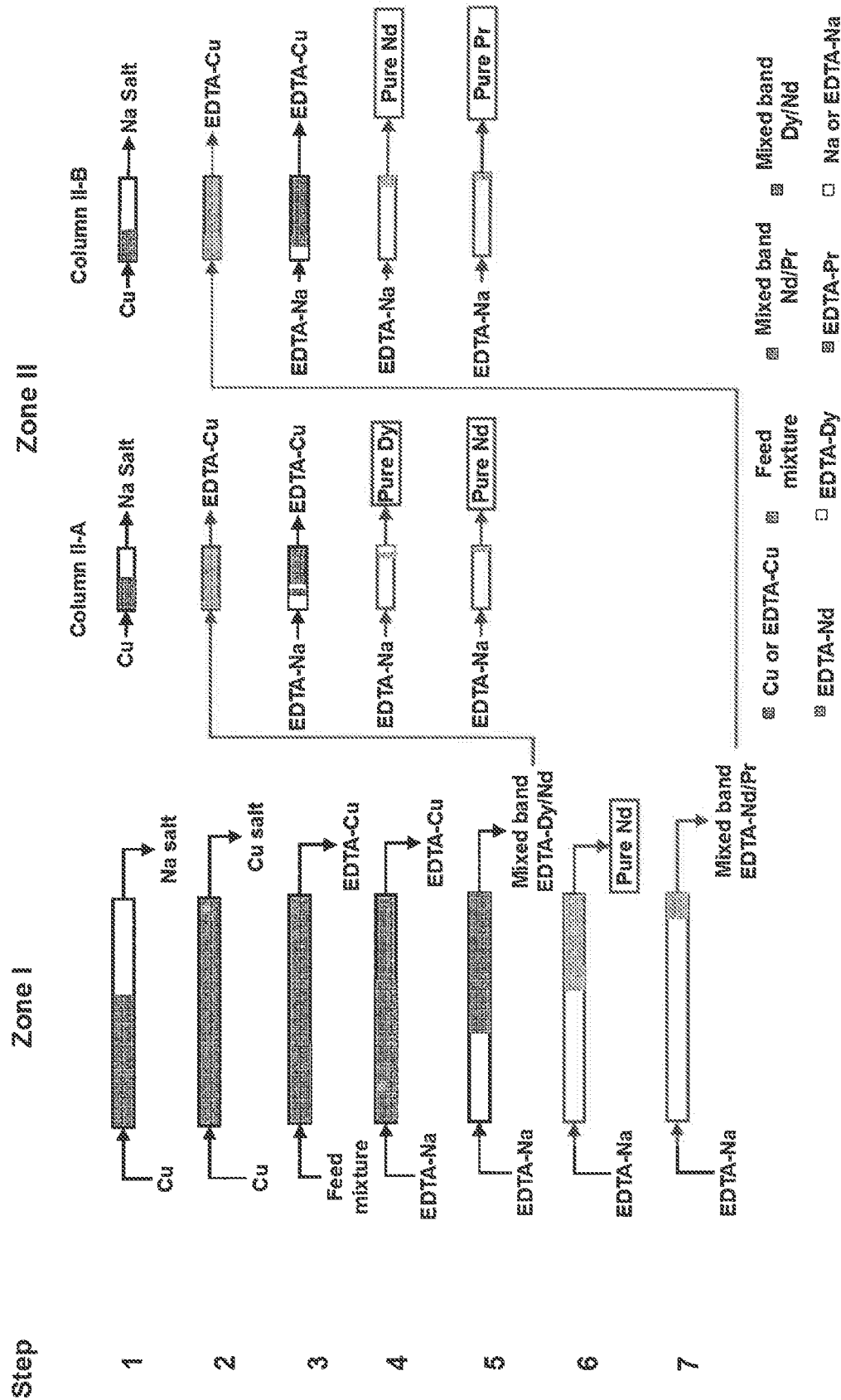
FIG. 10 is a schematic design of two-zone LAD for the separation of REE crude simulant derived from waste magnets. Zone I aims to recover high purity Nd. In Zone II, Column II-A aims to recover high purity Dy and Nd. Column 11-B aims to recover high purity Nd and Pr.
Figure 11:
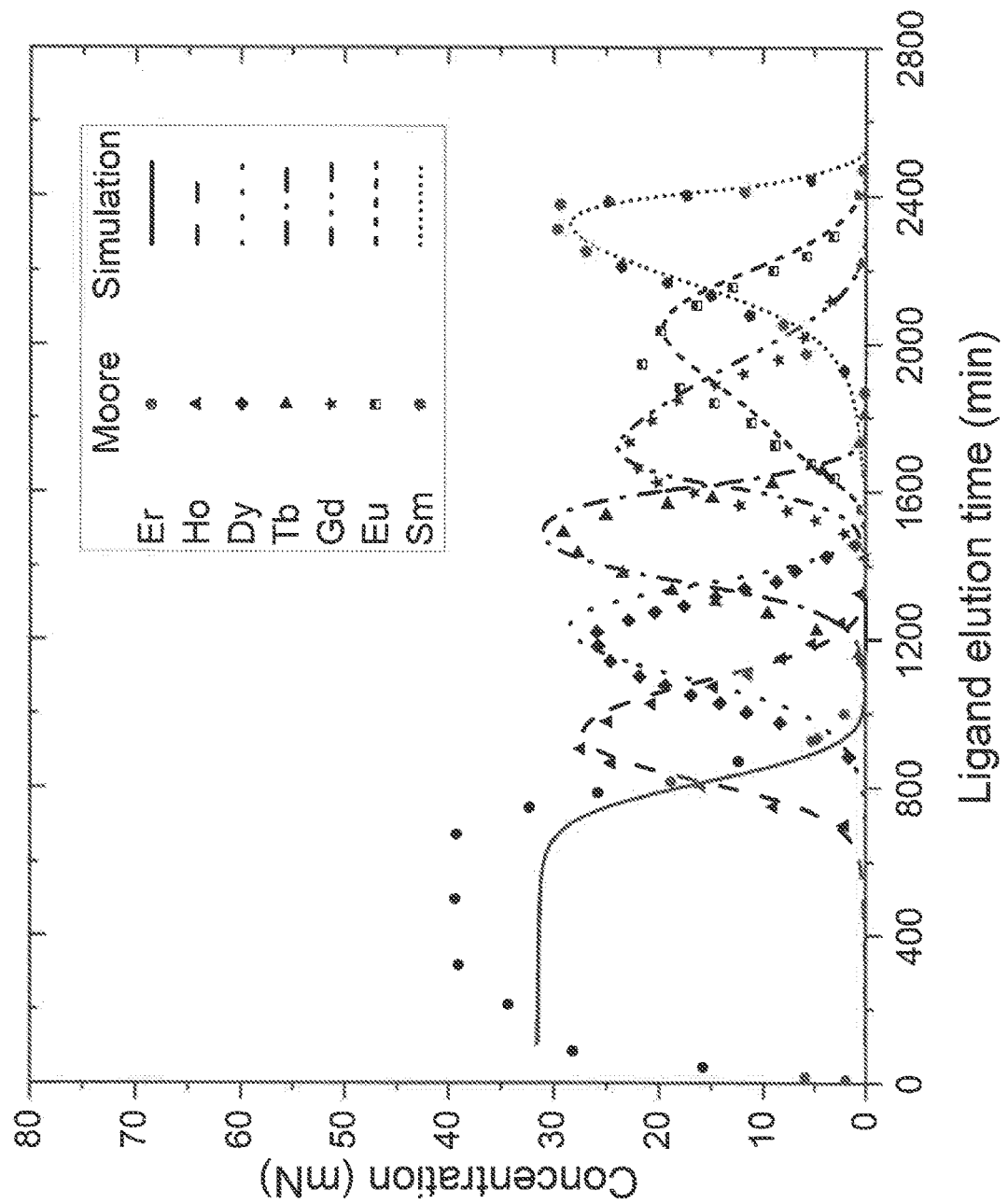
FIG. 11 graphically illustrates ligand elution time and a function of concentration.
Figures 12A, 12B:
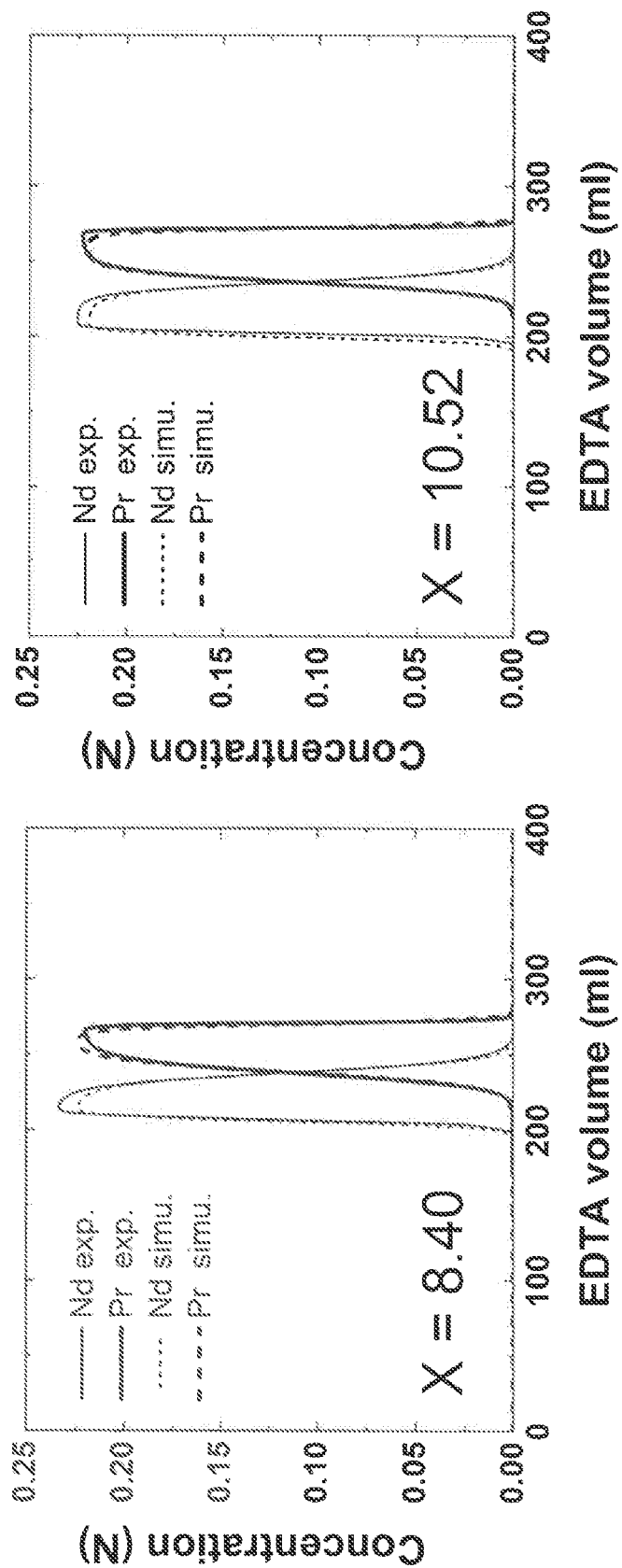
FIGS. 12A-12F graphically illustrate the separation of equimolar mixture of Nd and Pr (0.3 N) using 0.09 M EDTA-Na (pH 9). The experiments were designed for different X values: (a) 8.40; (b) 10.52; (c) 14.04; (d) 20.98; (e) 32.15. The mass transfer zone lengths in experiments and simulations are compared in (f).
Figure 12D:
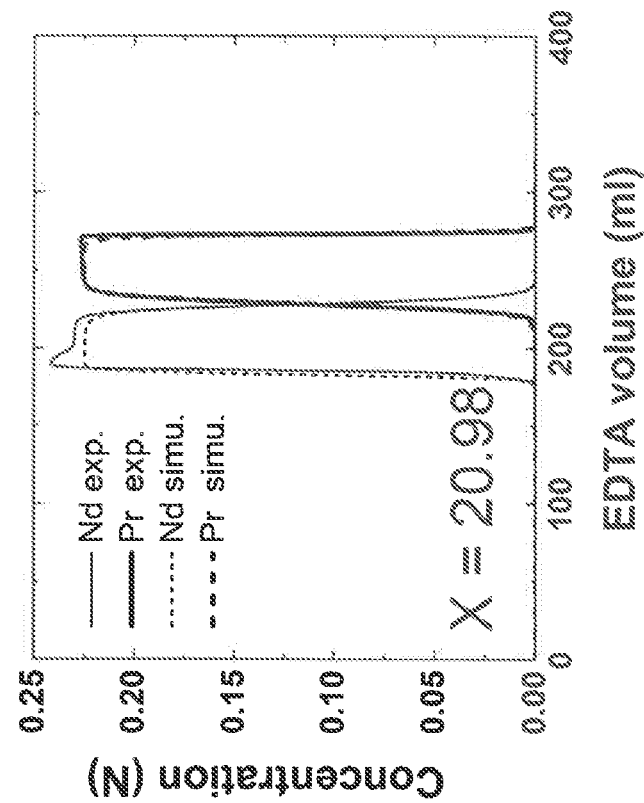
Figure 12C:
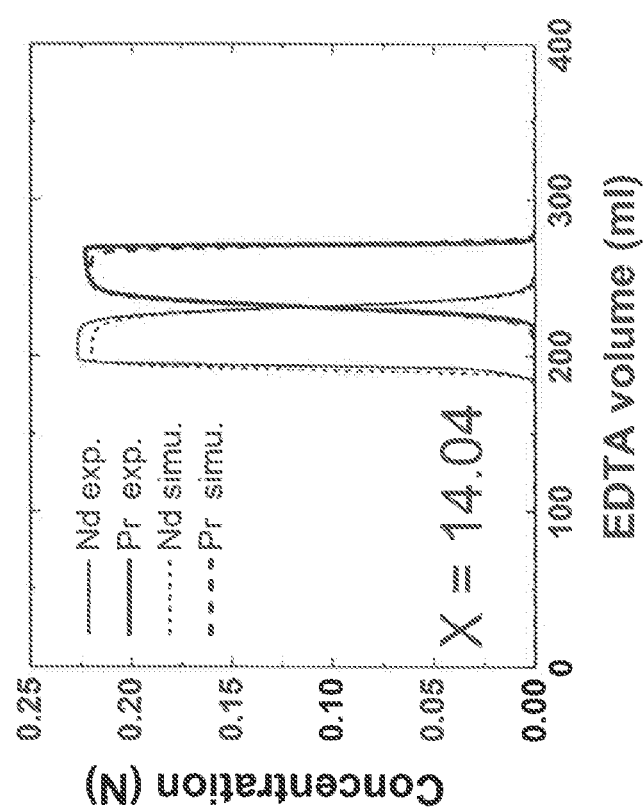
Figure 12F:
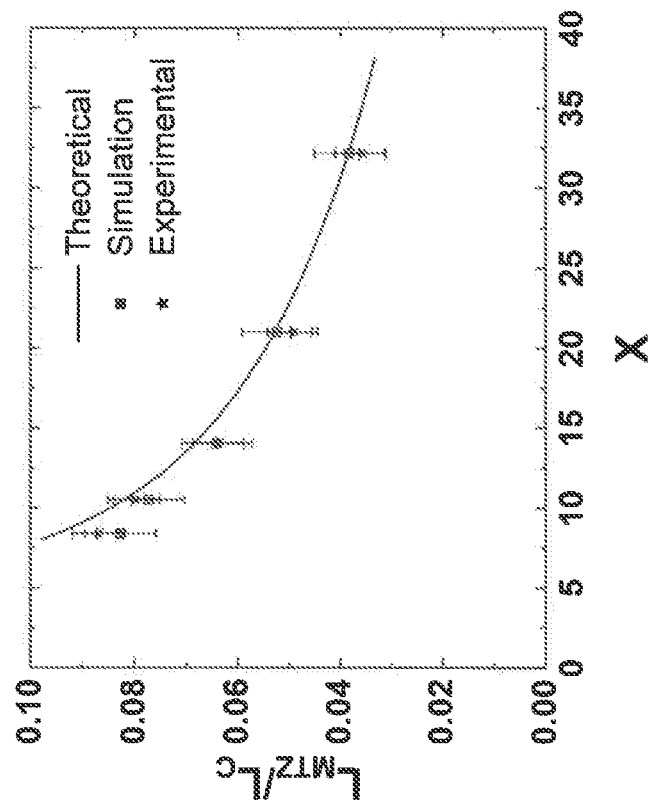
Figure 12E:
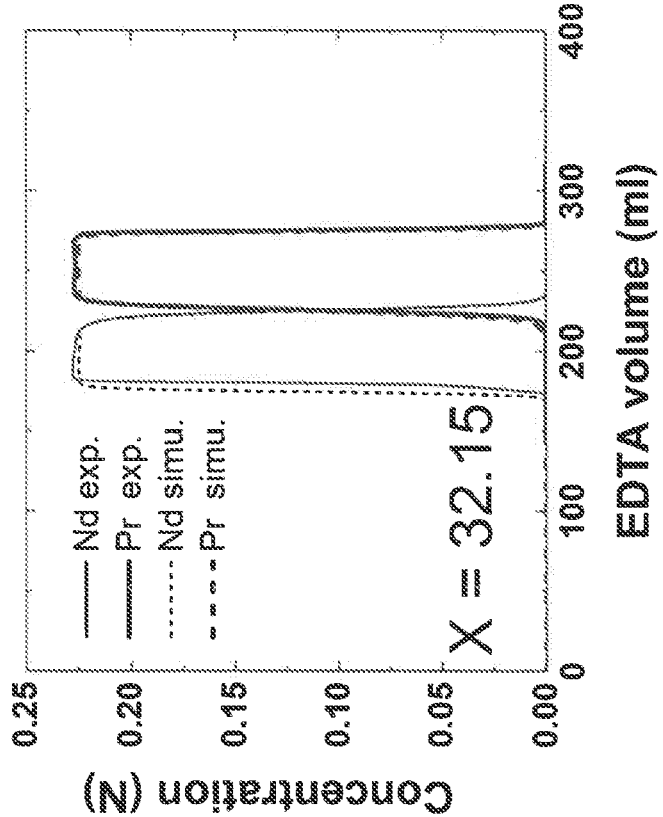
Figure 13:
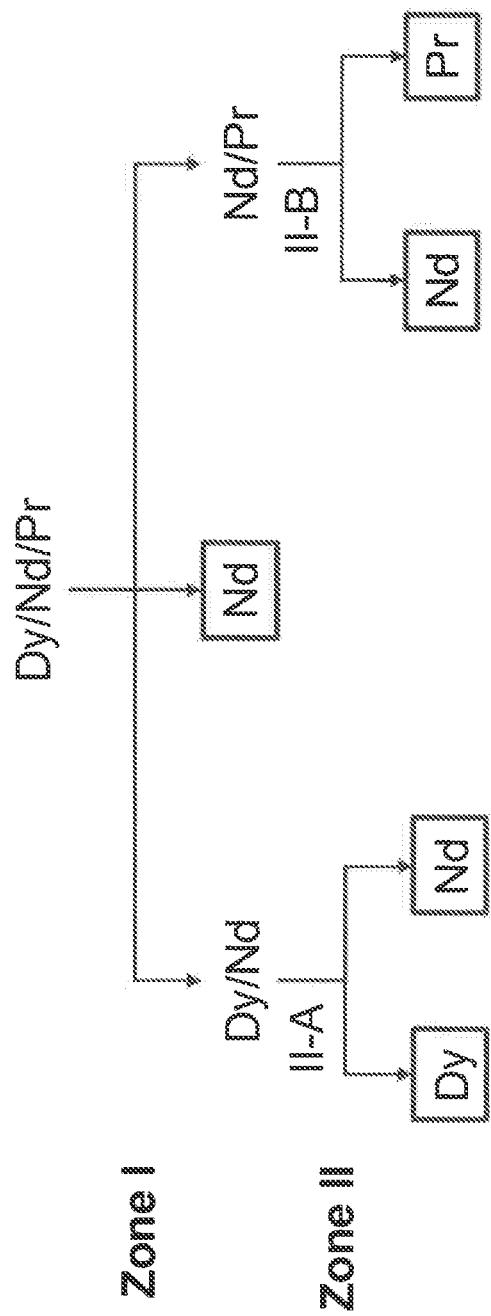
FIG 13 graphically illustrates Elution profiles of LAD tests for (a) Zone I: obtaining the majority of Nd. The two mixed bands, Dy-Nd and Nd-Pr mixed bands (grey shade), were sent to Zone II for further separation; (b) Zone II Column A: separating Dy and Nd from the mixed band generated in Zone I; (c) Zone II Column B: separating Nd and Pr from the mixed band generated in Zone I. In both Zone II Column A and B, the mixed bands will be recycled to their original feed solution (mixed bands from Zone I).
Figure 14A:
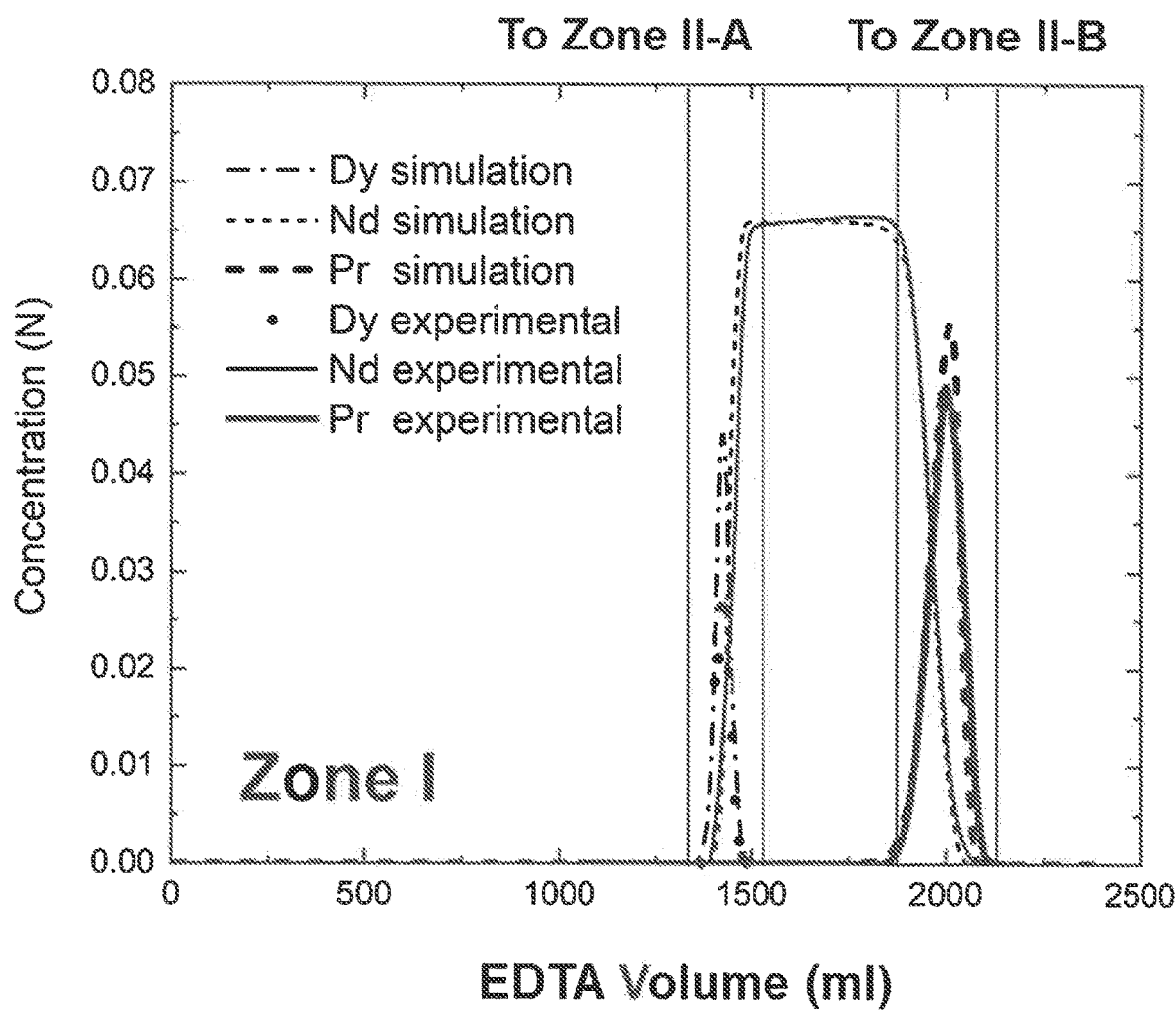
FIGS. 14A-C schematically illustrate the separation mechanism of LAD for rare earth elements.
Figure 14B:
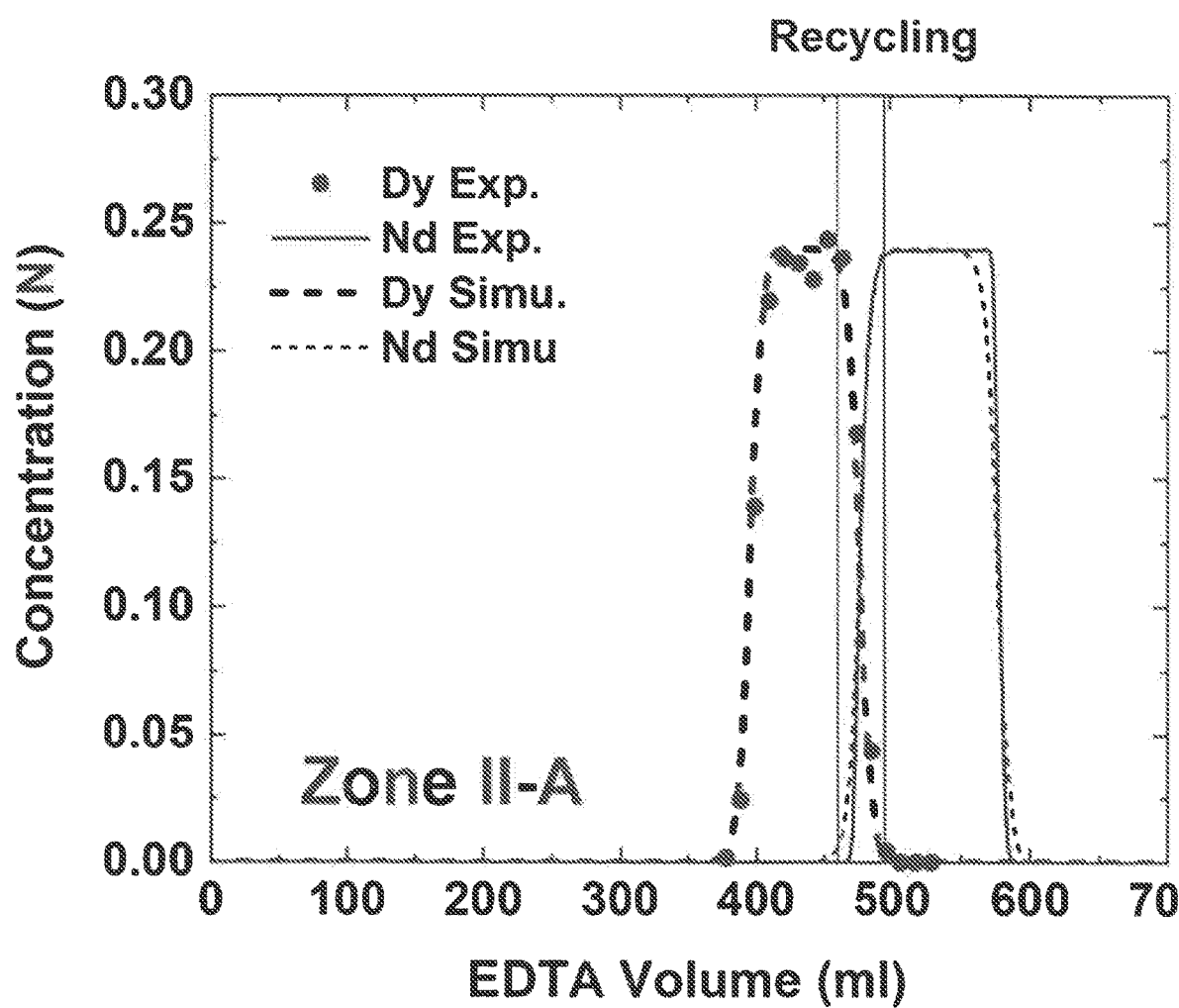
Figure 14C:
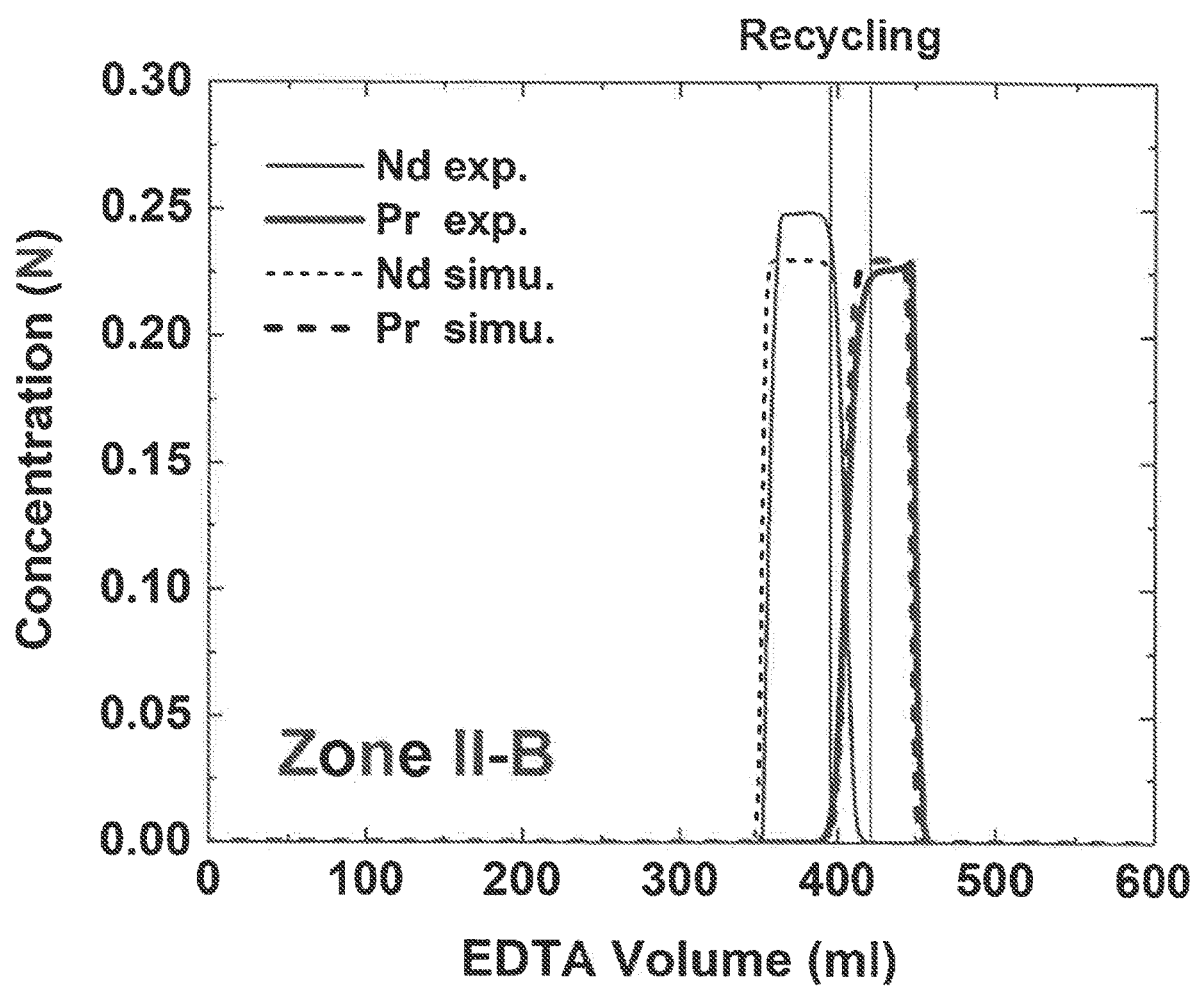
Figure 15:
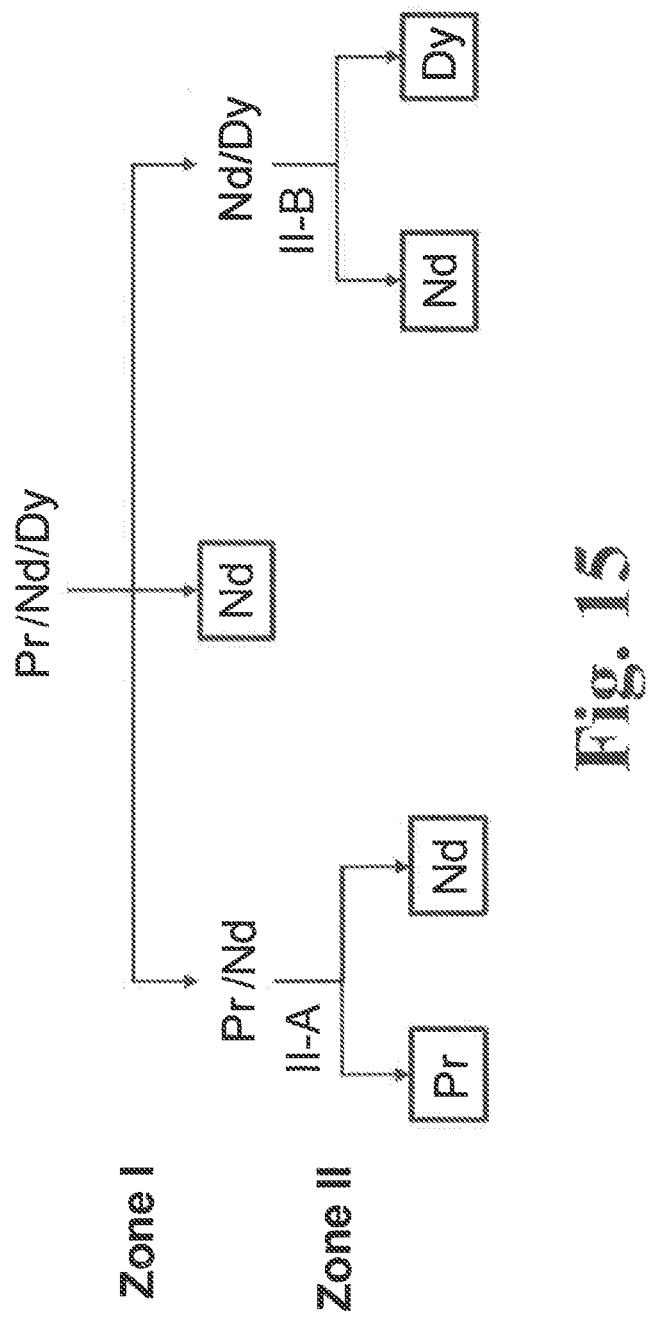
FIG. 15 graphically illustrates mass transfer zone length for a given system first decreases with increasing column length, and then no longer decreases after the column length reaches the minimum column length to form a constant pattern.
Figure 16A:
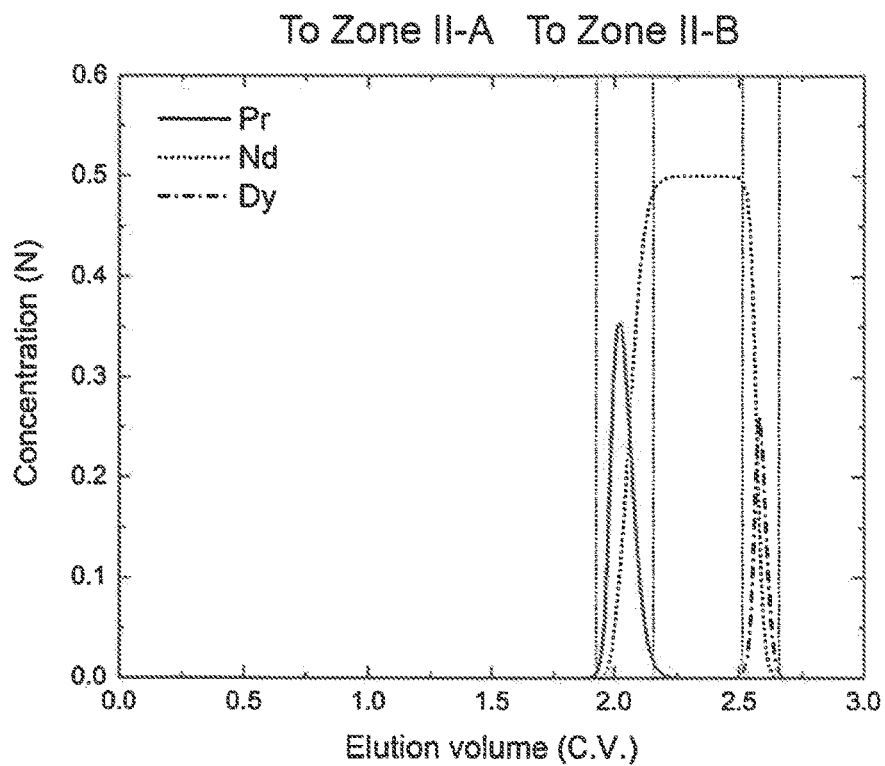
FIGS. 16A-C graphically illustrate a constant-pattern general map.
Figure 16B:
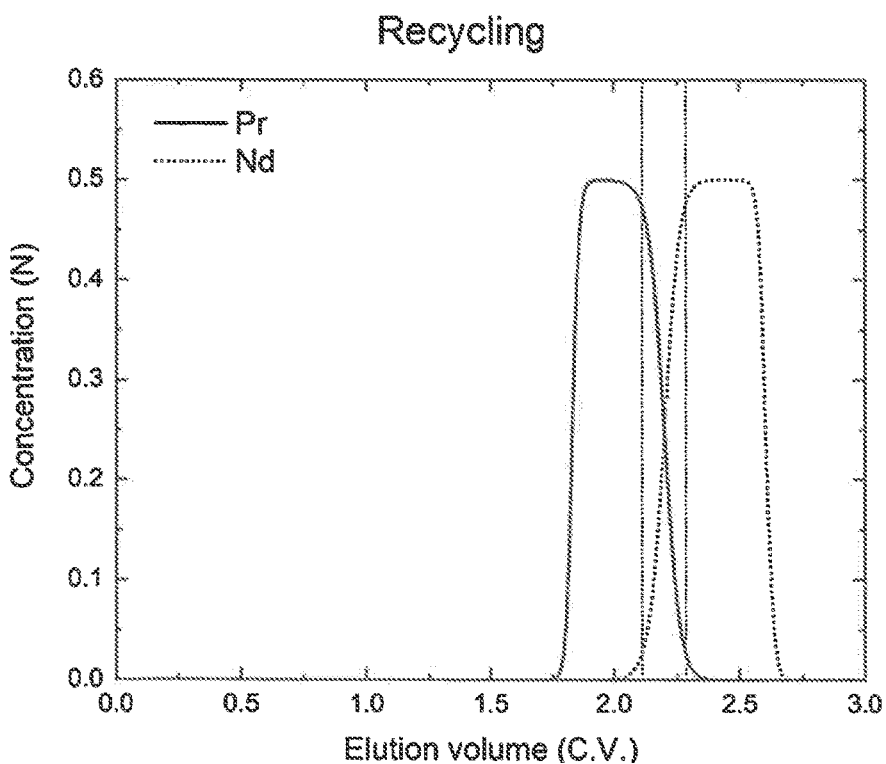
Figure 16C:
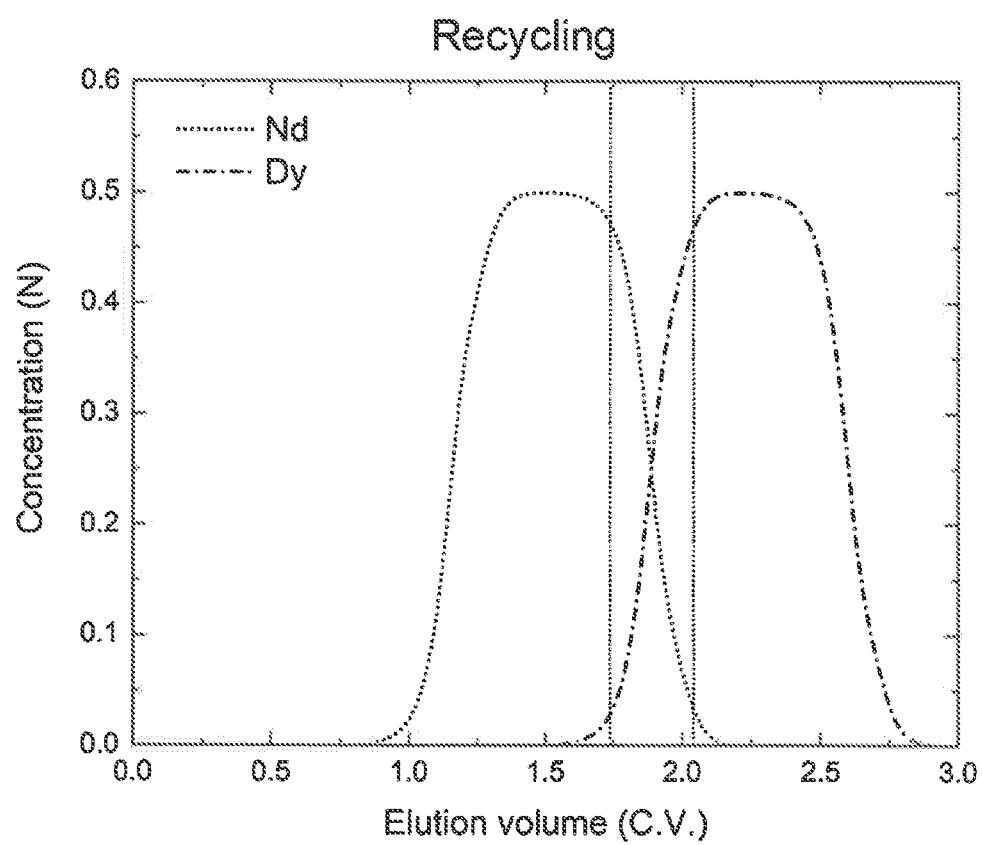
Figure 17:
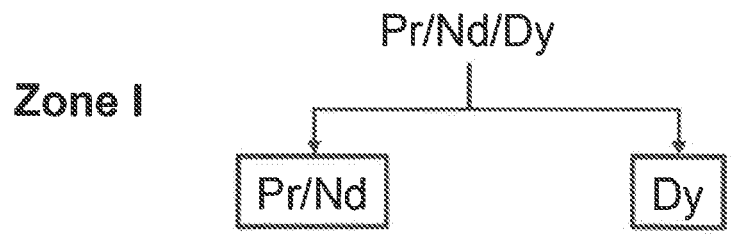
FIG. 17 is a flowchart of productivity optimization in the constant-pattern design.
Figure 18:
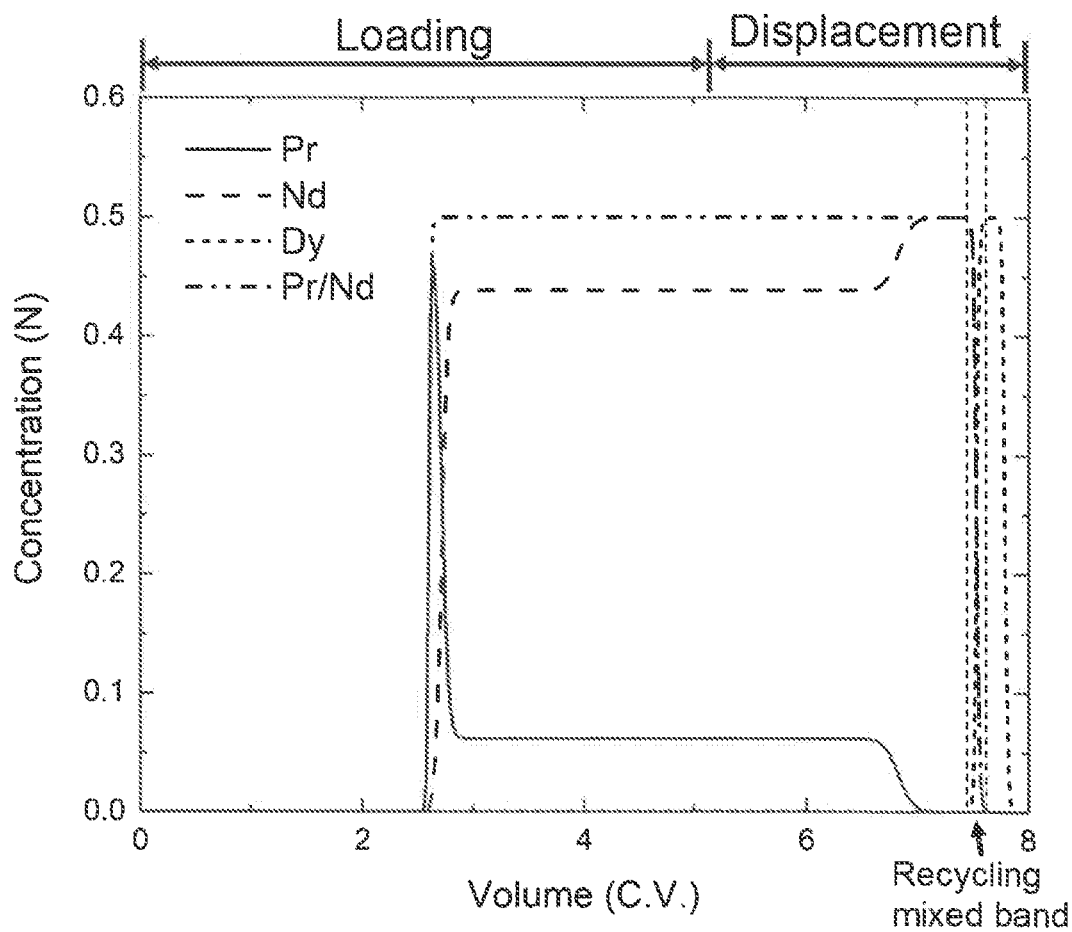
FIG. 18 graphically compares the calculated yield (dashed curve) and productivity (solid curve) of Nd versus linear velocity u0 for a fixed column length for separating the ternary REE mixture.
Figure 21:
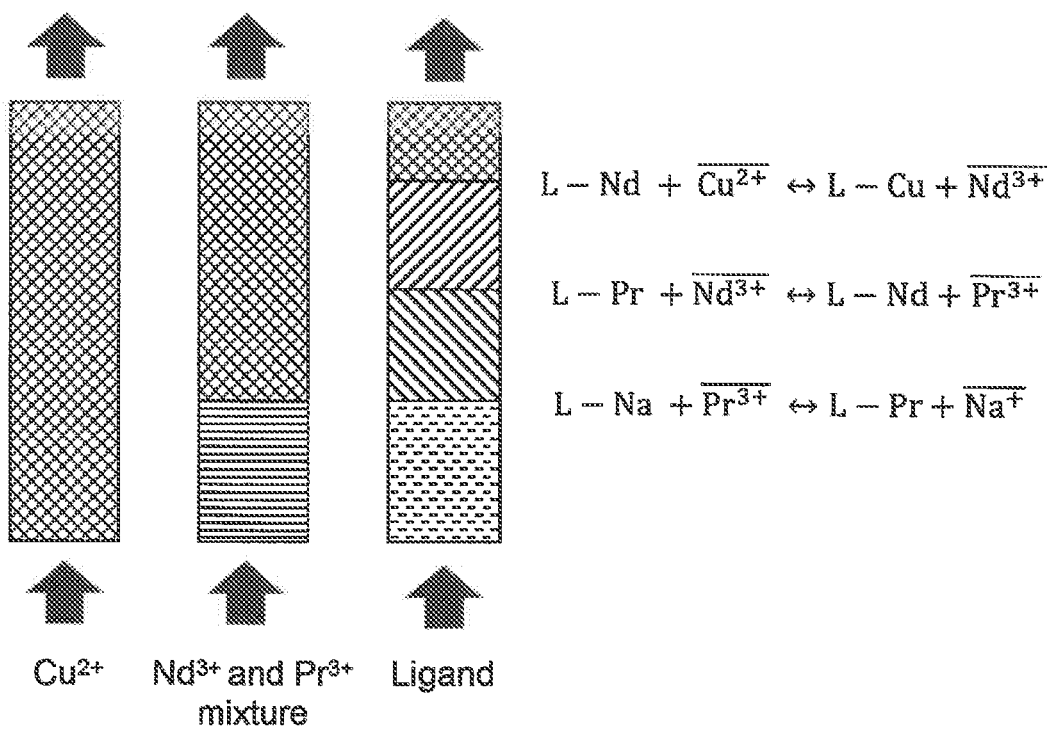
FIGS. 21 illustrates the parameters for Example A
Figure 22:
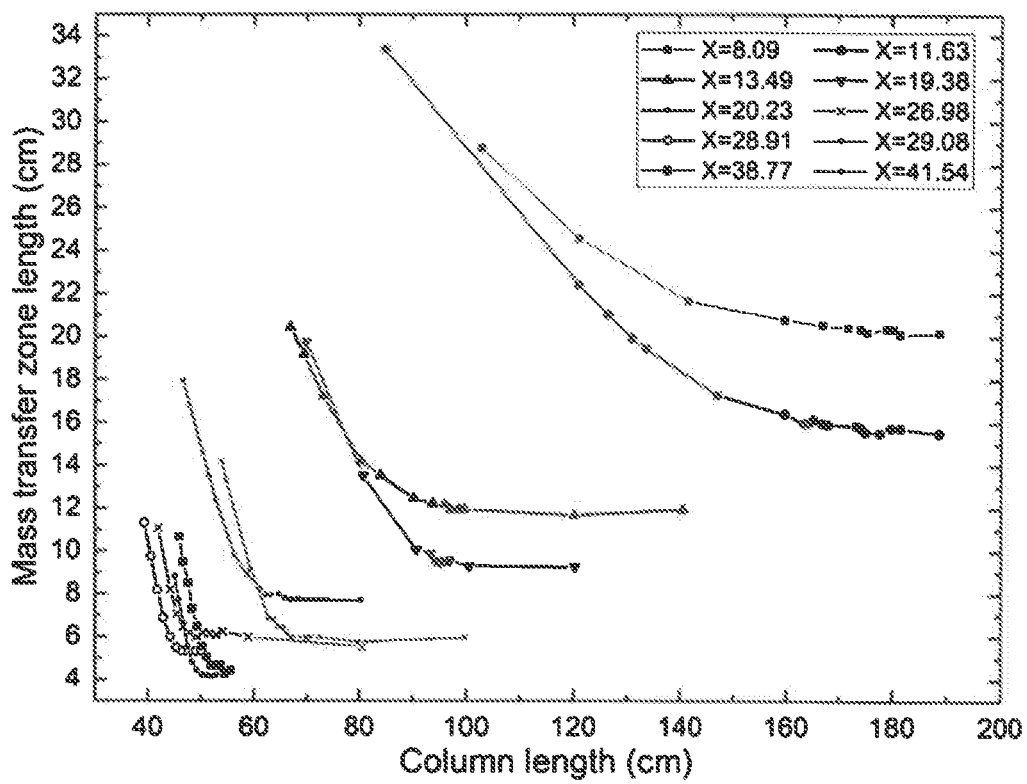
FIGS. 22 illustrates the parameters for Example B.
Figure 23:
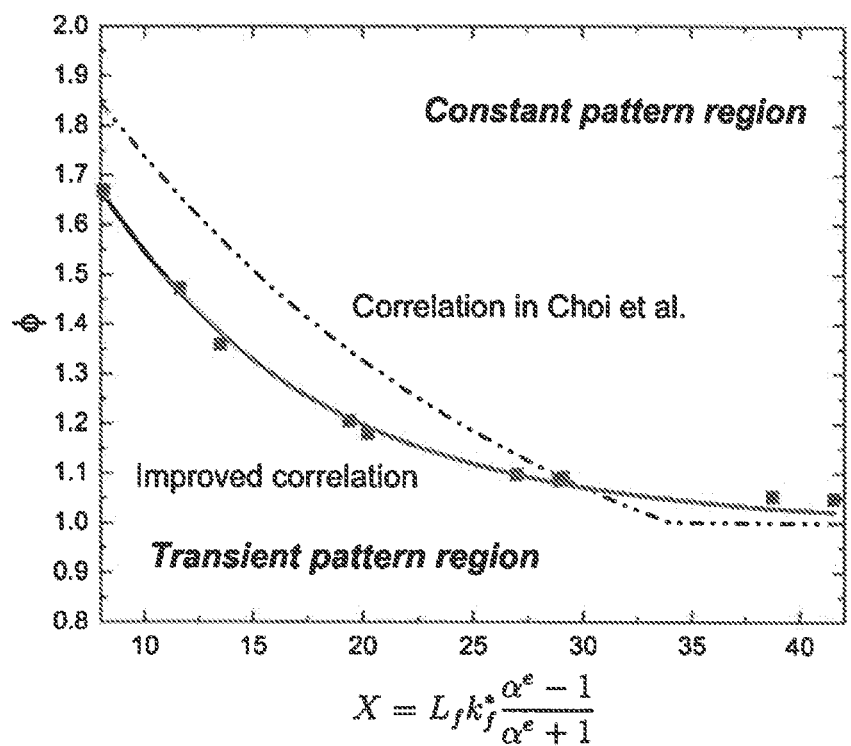
FIGS. 23 illustrates the parameters for Example C.
Figure 24:
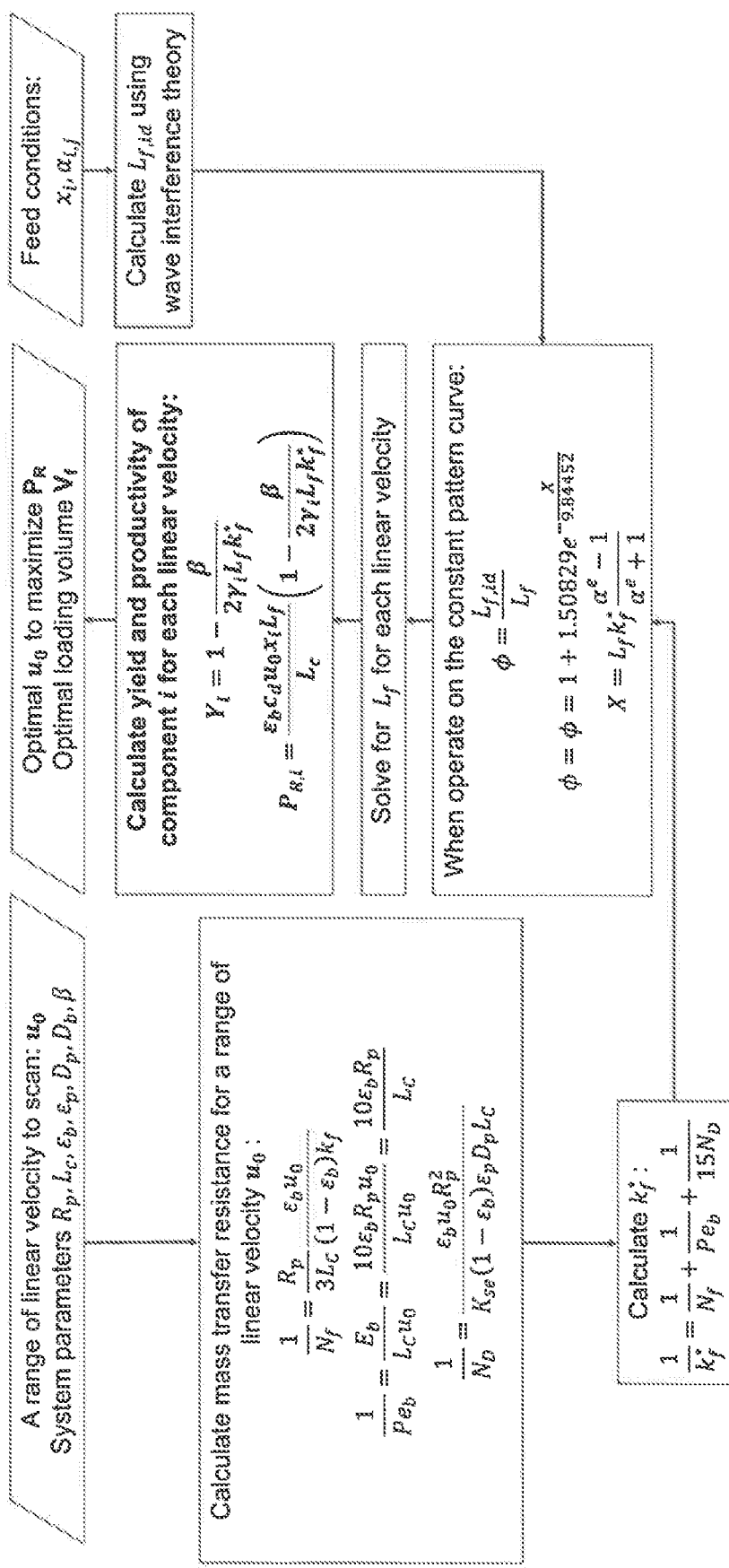
FIGS. 24 illustrates the parameters for Example D.
Figure 25:
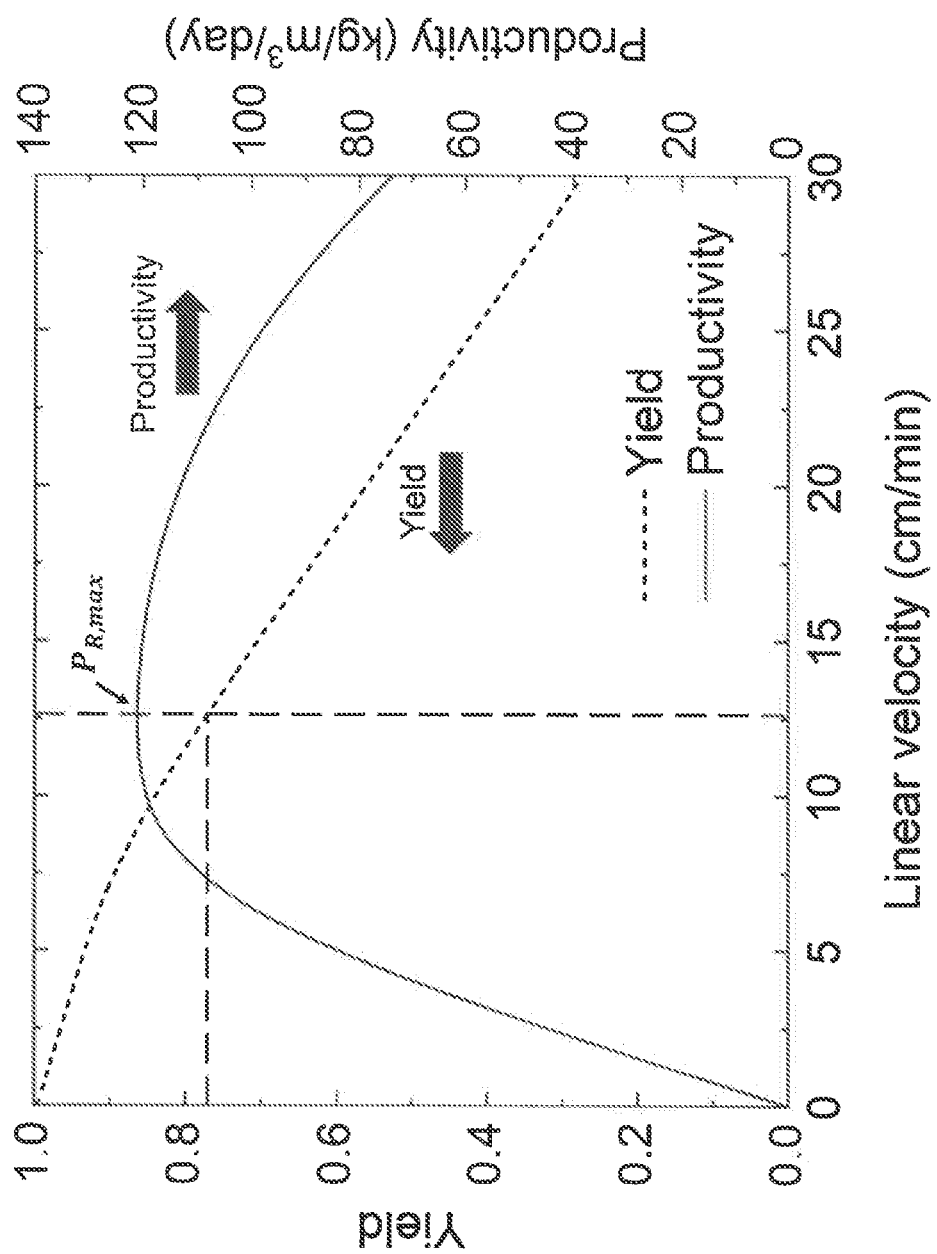
FIG. 25 is a flowchart illustrating a first splitting strategy for recovering all components of a mixture.
Figure 26:
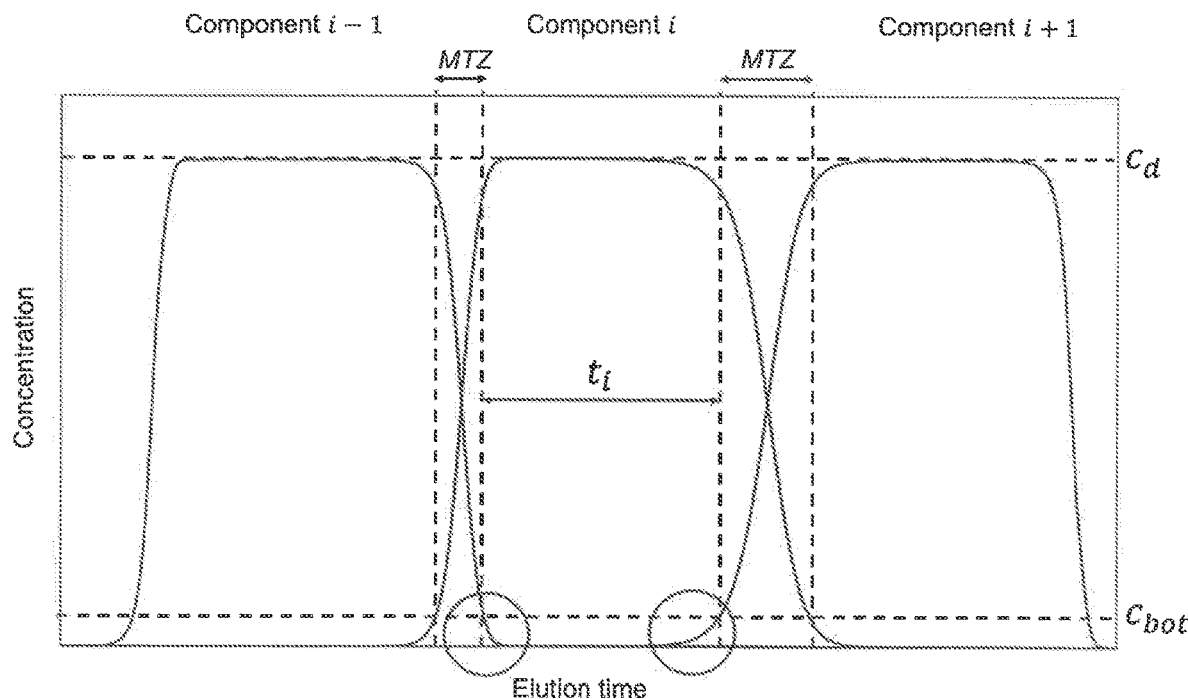
FIG. 26 is a flowchart illustrating a second splitting strategy for recovering all components of a mixture.
Figure 27:
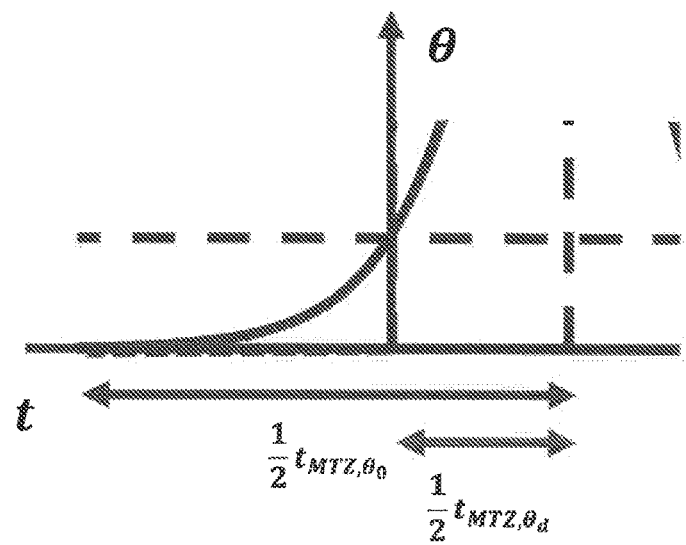
FIG. 27 is a flowchart illustrating a splitting strategy for recovering a group of adjacent components of a mixture.

The new technology, as illustrated in FIGS. 1-28, has the potential to transform current REEs separation and purification processes into green and clean processes, provide a driving force for producing high-purity REEs from waste magnets, and help achieve a circular REE economy.

Constant-Pattern Isotachic Train and the General Constant-Pattern Correlation

Ligand-assisted displacement chromatography uses a ligand (chelating agent) in the mobile phase to separate a mixture of different REEs into separate, REE-specific components. Details for the separation mechanism are given below. The formation of an isotachic (constant speed) train in a long column is a distinct feature of displacement chromatography. In an ideal system, all components will form rectangular solute bands and migrate at the same velocity. In a non-ideal system, the boundaries between adjacent solute bands (or concentration waves) are spread because of diffusion or dispersion effects. The overlapping regions decreases as the bands begin to separate because they migrate at different velocities. Eventually, wave spreading due to diffusion or dispersion effects is counterbalanced by wave sharpening due to displacement effects, in which the concentration waves reach a "constant pattern" and each mass transfer zone length reaches a fixed value, $L_{MTZ,CP}$.

The instant novel technology presents a new general correlation (Eq. (1)) that was developed using the modulated Langmuir isotherm, which can simulate the LAD process more closely for REE crudes containing no ligand. The detailed derivation of the mass transfer zone length and the development of the new general correlation, Eq. (1), can be found in Appendix B.

$$\phi_{min} = 1 + 1.5 e^{-\frac{X}{9.8}} \quad (1)$$

$\phi_{min}$ is the minimum column length to reach a constant-pattern isotachic train for a non-ideal system divided by that for an ideal system, X is the product of the loading fraction $L_f$, the dimensionless overall mass transfer coefficient $k_f^*$, and a selectivity term $$\left(\frac{\alpha^e - 1}{\alpha^e + 1}\right).$$

The general correlation divides the two-dimensional space into two regions: a constant-pattern region and a transient-pattern region. One can use this "map" to predict whether the concentration waves between the two adjacent bands can reach constant pattern for the given system and operation parameters. Furthermore, this general correlation, Eq. (1), has been incorporated into the constant-pattern design method for the separation of feedstocks with no ligand.

Constant-Pattern Isotachic Train and the General Constant-Pattern Correlation in LBD In LBD systems, where ligands are immobilized on the stationary phase, REEs mixtures can be also separated into distinct displacement bands and form a constant-pattern isotachic train. Ligand on the stationary phase provides the selectivity for separation. The column is presaturated with a component that has a lower affinity than all the components in the feed (Na+), and the displacer (H+) has a higher affinity for the ligand than all the components in the feed. The feed component with the lowest affinity for the immobilized ligand elutes first. In LBD sorbent regeneration and ligand regeneration are combined into one single step, whereas LAD requires a separate step for regenerating the ligand in the mobile phase. Hence, LBD is expected to have a lower processing costs than LAD.

Similar to that in LAD, a general correlation is also developed for predicting the formation of constant pattern isotachic train in LBD, Eq. (2).

$$\phi_{min} = 1 + \frac{7.2}{X} \quad (2)$$

Trade-Off Curve Between Yield and Productivity for a Complex Mixture with a Minority Component If a single column is used for producing a product with a desired purity, there is a trade-off between yield and productivity. To increase the yield of a target component, a slow mobile phase velocity is required to sharpen the waves and reduce the lengths of the overlapping regions with the adjacent bands. However, the slow velocity results in a small sorbent productivity. If a high velocity is used to increase sorbent productivity, the waves are more spread and the lengths of the overlapping regions increase, resulting in a lower yield. This relation between yield and productivity is known as the "trade-off" curve for a single column.

If the goal is to use a single column to recover only one REE with a target yield, the design results for an REE mixture with mole fractions of 0.83 for Nd, 0.12 for Pr, and 0.05 for Dy are shown. The curves were generated based on the constant-pattern designs with a fixed breakthrough cut θ of 0.05. In practice, breakthrough curves can be monitored using online detectors. A design with a fixed breakthrough cut is easy to implement for collecting products. However, to satisfy the component mass balance requirement at a constant-pattern state, only two out of the three variables (purity, yield, and breakthrough cut, θ) can be specified in the design for a single column. For a fixed θ of 0.05, the resulting yield, productivity, and product purity for recovering a single REE (Dy, Pr, or Nd) from the REE mixture are shown. The purity for the target component exceeds 99% if the target yield is greater than 63.5%. The curves are "approximate" trade-off curves, since the target product purities are not fixed, and they vary slightly from 99% to over 99.9%.

If a single column is designed to recover the minority component Dy with a high purity (99.9%) and a high yield of 95%, a very slow velocity is required to sharpen the concentration waves to minimize the mass transfer zone lengths (the overlapping regions of two adjacent bands), resulting in a very low sorbent productivity, 0.04 kg Dy/m³/day. In contrast, for producing the majority component Nd with the same purity and yield from the same feedstock, the productivity is 64.2 kg Nd/m³/day, which is 1,600 times higher than that of Dy. If the target yield of Nd is lowered from 95% to ca. 77%, the productivity of Nd can be further increased to 120 kg Nd/m³/day while the purity of Nd is 99.5%. The results show that for producing a high-purity product (>99%) from the complex feedstock, the sorbent productivity highly depends on the target component.

Generally, if a single column is used for the recovery of a single component from a complex mixture, the product purity is controlled by the breakthrough cut $\theta$ and the yield of the target component. The sorbent productivity is controlled by a selectivity-weighted composition factor $\gamma_i$, defined in Eq. (2).

$$\gamma_i = \frac{x_i}{\frac{\alpha^e_{i,i-1}+1}{\alpha^e_{i,i-1}-1} + \frac{\alpha^e_{i+1,i}+1}{\alpha^e_{i+1,i}-1}} \quad (2)$$

The yield $Y_i$ and the sorbent productivity $P_{R,i}$ are related to the $\gamma_i$ values by Eq. (3) and Eq. (4):

$$Y_i = 1 - \frac{\beta}{2\gamma_i L_f k'_f} \quad (3)$$

$$P_{R,i} = \frac{\varepsilon_b c_d u_0 x_i L_f}{L_c}\left(1 - \frac{\beta}{2\gamma_i L_f k'_f}\right) \quad (4)$$

where $x_i$ is the mole fraction of component i in the feed mixture; $\beta$ is the natural logarithm of the ratio of $(1-\theta)$ to $\theta$, where $\theta$ is the breakthrough cut; $\alpha^e_{i,i-1}$ is the selectivity between component i and the component eluting ahead of component i; $\alpha^e_{i+1,i}$ is the selectivity between the component eluting after component i and component i; $\varepsilon_b$ is the bed void fraction; $c_d$ is the effective ligand concentration, $u_0$ is the linear interstitial velocity of the mobile phase; and $L_c$ is the column length, For an equimolar mixture, where $x_i$ is the same for all components, the component i with the highest selectivities will have the narrowest mixed band regions between its two adjacent bands. This component will have the highest value of $\gamma_i$, the highest yield, and the highest productivity.

For a complex mixture, if the selectivity between each pair of the adjacent components was the same, the constant-pattern mass transfer zone length would be the same for all solute bands. As $x_i$ increases, the displacement band becomes wider. The component with the highest mole fraction has the highest yield, because the overlapping region relative to total displacement band width is the smallest, and the yield loss due to the mixed band relative to total amount is the smallest. The component with the largest $x_i$ value or the largest $\gamma_i$ value has the highest yield and the highest productivity.

Therefore, the selectivity-weighted composition factors $\gamma_i$ account for the effects of composition and selectivity. The component with the largest $\gamma_i$ value can be separated from a mixture with the highest productivity using a single column. The $\gamma_i$ values for the ternary mixture are listed in Table 2. In this mixture, Dy has the smallest $\gamma_i$ value, hence it is separated from the mixture with the smallest productivity, whereas Nd, which has the largest $\gamma_i$ value, is separated from the mixture with the largest productivity.

TABLE 2

Concentration and selectivity of REEs in a mixture derived from waste magnets

| Component | Molar fraction ($x_i$) | $\alpha^e_{i,i-1}$ | $\alpha^e_{i+1,i}$ | $\gamma_i = \dfrac{x_i}{\dfrac{\alpha^e_{i,i-1}+1}{\alpha^e_{i,i-1}-1} + \dfrac{\alpha^e_{i+1,i}+1}{\alpha^e_{i+1,i}-1}}$ |
|---|---|---|---|---|
| Dy | 0.05 | >>1 | 5 | 0.020 |
| Nd | 0.83 | 5 | 1.8 | 0.166 |
| Pr | 0.12 | 1.8 | >>1 | 0.027 |

If a single column is used to recover all three components with high yields and high purities from the mixture, the velocity or flow rate is limited by the yield requirement for Dy, the component with the smallest $\gamma_i$ value. If the design aims to recover Dy with 95% yield, the productivities of Nd and Pr are also small because of the low velocity. As a result, the total REE productivity is only 0.7 kg/m³/day.

However, if the separation of the three REEs occurs in two separate zones, one can recover high-purity REEs with high yield and high productivity. A systematic splitting strategy is developed. The component with the largest $\gamma_i$ value, Nd, is recovered first with a high purity and high productivity in Zone I. The two mixed bands of Zone I, Dy/Nd and Nd/Pr, are then sent to Zone II for further separation. The mixed band material in Zone II is then recycled to the inlet of Zone II to achieve high yields (99%) for all three components. In this method, the productivity and the yield of each component are no longer limited by the trade-off curves for a single column. The overall productivity of a two-zone design with high purity (>99.5%) and high yield (>99%) for all three REEs is more than 100 times higher than that of the single column design with similar product purity and 95% yield of Dy. The two-zone design is explained in more detail below.

Constant-Pattern Design of a Two-Zone LAD for the Separation of a Ternary REE Mixture of Dy, Nd, and Pr The constant-pattern design method for a single column reported previously[38] was modified here by incorporating the new general correlation, Eq. (1), and the new zone-splitting strategy based on the $\gamma_i$ values of Eq. (2). The multi-zone, constant-pattern design method is based on the advanced wave theories, general zone splitting strategies, and the intrinsic (or scale-independent) parameters. This method applies to many production scales and can handle complex feed mixtures with multiple components and widely different concentrations. For desired product purities and yields, if the intrinsic parameters, the feed composition, and volume are known, the method can generate the zone configuration, column size, and the optimal operating velocity for each zone to achieve the maximum sorbent productivity.

For the separation of a ternary mixture of Dy (5%), Nd (83%), and Pr (12%), a schematic of the design is shown in the drawings. Zone I is designed to recover the majority of Nd, which has the highest $\gamma_i$ value in the original feed. In Zone I, Step 1, the column is pre-equilibrated with $Cu^{2+}$ solution. In Step 2 the feed mixture is fed into a $Cu^{2+}$-loaded column. In Steps 3-7, a ligand solution (EDTA-Na) is loaded into the column, separating the feed mixture into three fractions: a Dy/Nd mixed band, a pure Nd band (the target product of Zone I), and a Nd/Pr mixed band. After all the REEs are eluted from the column, the column is in the Na⁺ form and then presaturated again using $Cu^{2+}$ solution. The Dy/Nd mixed band from Step 5 and the Nd/Pr mixed band from Step 7 are sent to Column II-A and Column II-B in Zone II, respectively. The mixed bands from the Zone II columns are collected and recycled directly back to Columns II-A and II-B to further increase the yields. For simplicity, the recycle streams within Zone II and the column washing steps are not shown.

Rate model simulations were developed for Zones I and II. Batch LAD experiments were done first to test the rate models based on the modulated multicomponent Langmuir isotherm and the intrinsic parameters. The verified isotherm and parameters were used to design a two-zone LAD system for the separation of a ternary mixture with a similar REE composition as in waste magnets.

Prior to LAD purification, it is convenient for the metals in waste magnets to first be converted into soluble salts. Common conversion methods include (1) hydrometallurgical, (2) pyrometallurgical, (3) hydrothermal, and (4) electrochemical methods.

In hydrometallurgical processes, waste magnets are dissolved in concentrated (up to 8 M) nitric acid or hydrochloric acid. REEs as well as other metals in the waste magnets can be completely dissolved and converted into soluble salts. The impurities such as Fe can be removed by adjusting solution pH. Excess acids remaining in the dissolution solution need to be neutralized before loading into chromatography columns for purification.

Waste magnets can be also processed using pyrometallurgical methods. Magnets are demagnetized at 300-400° C., crushed, ground into small particles. Alternatively, waste magnets can be converted into small particles (100 microns) by hydrogen decrepitation. Magnets particles are then roasted at high temperatures (>800° C.) to form metal oxides. A dilute acid (<2 M) is used to selectively dissolve the REE, Co, and other metal oxides to produce a solution of metal ions for further purification.

A hydrothermal process for converting waste magnets into soluble salts is given as follows. A waste magnet (10 g) may be placed for some time, for example about 18 hours, in a hydrothermal reactor (50 mL) with water (30 g) and a small amount of salt (0.01 g NaCl, or 0.03 wt. %), at 250° C. and 550 psi. The Nd-rich phase reacts with water, leading to the formation of $Nd(OH)_3$. Hydrogen is absorbed by the $Nd_2FeB$ phase, causing volume expansion and the disintegration of the phase into fine powders. The metal alloy is oxidized to $Fe_3O_4$ and $REE(OH)_3$. The metallic coating is disintegrated and separated from the powder by sieving. A large fraction of the $Fe_3O_4$ powder may be separated using magnetic separation. The REE hydroxides typically have less than 5% impurities, and may be dissolved in a dilute acid (<0.5M) for further purification.

Electrochemical methods may also be employed for dissolution of waste magnets. The magnets may be used as a sacrificial anode, where REEs and other metals were oxidized to form metal hydroxides. A dilute acid (0.2 M) is used to selectively dissolve REEs into the aqueous solution, while $Fe(OH)_3$ remains in the solid residue. The solution containing REE and other metal ions is typically used as the feedstock for LAD separation after filtration.

Example 1

Two packed columns were connected with a total column length of 127 cm. The ternary mixture which mimics REEs crude derived from waste magnets was prepared and separated using LAD. The detailed experimental conditions and simulation parameters are summarized in Table 9. In Zone I, the feed concentrations were 0.05 N Dy, 0.83 N Nd, and 0.12 N Pr. The column effluent was monitored with an Agilent PDA detector. The effluent was also collected in fractions using the Agilent 440-LC fraction collector. The Dy concentrations were analyzed with ICP-OES.

In Zone I two mixed bands were generated, one with Cu/Dy/Nd and one with Nd/Pr. More than 10 runs of Zone I were needed to generate enough mixed band materials to test the separation in Zone II. The effluent history for the separation of the mixed bands in Zone II was examined using synthetic mixtures. The concentrations of REEs in the mixed bands were calculated from the elution profile from Zone I. Note that the REEs mixed bands collected from LAD tests were mixtures of EDTA-REEs complexes rather than aqueous solutions of free REE ions.

For preparing a mixed band of Cu/Dy/Nd, 3.143 g $Dy(NO_3)_3 \cdot 5H_2O$ and 3.872 g $Nd(NO_3)_3 \cdot 6H_2O$ were dissolved in DI water first. The mixture was loaded into a copper-loaded column. The REEs were stripped off from the column using 0.09 M EDTA at pH=9. The mixed band was collected before a concentration decrease in Cu was observed, and the loaded REEs were collected in the mixed band. When this mixed band was diluted to 500 ml, the final concentrations of Dy and Nd were 0.043 N and 0.053 N. The experimental conditions and simulation parameters for the separation of Dy and Nd are summarized in Appendix E, Table 10. The effluent was monitored using a PDA detector and collected in fractions for measuring Dy concentrations using ICP analysis.

To prepare a mixed band of Nd/Pr, 2.513 g $Nd(NO_3)_3 \cdot 6H_2O$ and 2.146 g $Pr(NO_3)_3 \cdot 6H_2O$ were dissolved in 0.09 M EDTA solution (pH=9). About 1.04 g NaOH was added into the solution to prevent EDTA precipitation at low pH. The final solution volume was 200 ml, and the concentration of Nd and Pr were 0.086 N and 0.074 N, respectively. The conditions for the separation of Nd and Pr are summarized in Table 11.

Verification of the Rate Model Simulations

The rate model simulation results were compared with literature data, where erbium (Er) was used as the presaturant and EDTA was used as the ligand. The simulation parameters are summarized in Table 12. The sorbent was a cation exchange resin AG 50X12 with sulfonic functional groups. The simulation results are in good agreement with the experimental data, indicating the accuracy of the rate model simulations and the model parameters. Er, instead of Cu, was used as the presaturant. The selectivity between REEs in the feed and Er was 1.1 during the loading and increased to 1.95 after the ligand was introduced into the column.

The rate model simulations and the general map were compared with separation data. A binary mixture (0.3 N Nd, 0.3 N Pr) was prepared and fed into a 38-cm column. The Nd/Pr selectivity was 1.8, as measured previously. The mass transfer coefficients were estimated in our previous study. By changing the loading volume, different loading fractions ($L_f$) and dimensionless column lengths ($\phi$) were obtained. The X values corresponding to the $\phi$ values were calculated from the general correlation. The dimensionless mass transfer coefficients ($k_f^*$) were calculated from the X values, and the flow rates were obtained from the $k_f^*$ values. Five different feed volumes and their corresponding flow rates were used. The measured mass transfer zone lengths matched closely with the constant-pattern mass transfer zone lengths from the simulations and those from the general correlations.

Design and Testing of Zone I

The improved general correlation was used for designing a ternary separation system using a synthetic mixture with a similar composition as a REE crude derived from waste magnets (0.05 N Dy, 0.83 N Nd, 0.12 N Pr). The actual effective selectivity between Dy and Nd should be quite high because of a large difference between the ligand affinities. The Dy/Nd selectivity in the design was set as 5, which is sufficient to produce sharp waves in the design and the simulations.

The design for Zone I aimed to maximize the productivity of Nd in a single column. The yield for the highest Nd productivity was predicted to be 77.5%. The detailed experimental conditions are listed in Table 9. The pH of the ligand solution was kept at 9. The experimental elution profiles were compared with simulations. The design target yield for Nd in Zone I and the experimental yield and productivity of Nd for each test are summarized in Table 3. The target yields agree to within 1% with the experimental yields. The productivity of Nd exceeded 100 kg/m3/day in Zone I.

TABLE 3

Yields and productivities of Nd in Zone I and Zone II

| | Zone I | Zone II Column A | Zone II Column B |
|---|---|---|---|
| Target yield (%) | 77.5 | 73.4 | 74.6 |
| Experimental yield (%) | 78 | 89 | 74 |
| Experimental purity (%) | 99.3 | 99.8 | 99.5 |
| Productivity (kg/m³/day) | 133.0 | 88.0 | 14.4 |

Design and Testing of Zone II

To further increase the yield of Nd and to collect high purity Dy and Pr, the mixed bands of Dy/Nd and Nd/Pr (shaded grey regions in the elution profile) in Zone I could be collected and further separated in Zone II. Simulants with similar concentrations were run for demonstrating the Zone II separation.

In Zone I, an aqueous solution containing REE ions was fed directly to the column. The mixed bands collected from Zone I were then fed into Zone II. In Zone I, the REE ions were adsorbed together with no separation and formed a uniform mixture band near the column inlet, since selectivity was negligible. REE ions started separating after the EDTA ligand solution was introduced into the column. In the theoretical model and simulations, the selectivity change was accounted for by the modulated Langmuir isotherm, as explained in below.

The REE ions in the feed of Zone II were bound to EDTA, and the apparent displacement occurred during the feed loading. The REEs start separating during the loading because EDTA has different selectivities for the different REEs. The REE loading region was wider in Zone II than in Zone I, because EDTA is bound to the REEs during their migration. It was important to confine the REEs in a short fraction of the column length during the loading, in order to leave sufficient column length for further separation after the loading is finished. For this reason, a safety factor of 100% extra column length was incorporated in the Zone II design. Although such a large safety factor was used to demonstrate the separation in Zone II, in practice the actual safety factor can be smaller. The same design algorithm was used for both columns used in Zone II. The column length in the design program was 50% of the actual column length in the experiments, 89 cm.

The elution profiles are shown in the drawings, and the experimental yields and productivities are summarized in Table 3. The detailed experimental and simulation parameters are given in the Experimental section below. In Zone II Column A, the Nd yield target in the design was 73.4% to maximize the productivity, and the experimental yield of Nd was 89%. In the experiments, the mixed band between Nd and Na bands was defined as "pure" Nd, because in practice it is easy to separate Nd from Na by precipitating Nd as an oxalate or carbonate. In Zone II Column B, the Nd yield target was 74.6%, and the experimental yield was 74%. Recycling the mixed bands from the two columns in Zone II back to the feed of Zone II can further increase the yields of all components to 99% or higher.

Theoretical Predictions of the REE Yields in a Two-Zone LAD

The established theoretical model and the rate model simulations for both Zones I and II are in good agreement with the presented results. The experimental yields match closely or exceed the design target yields, with all components having a purity over 99%. The key condition for achieving a 99% yield for each component is the recycling and re-feeding the mixed bands in Zone II. Because experimental demonstrations of recycling mixed bands in Zone II can be tedious, VERSE simulations of LAD processes were done instead. The column length was 100 cm in the design and 120 cm in the simulations for a 20% safety factor. The Dy/Nd mixed band from a single run of Zone I was used as the feed for Zone II Column A, and the Nd/Pr mixed band from Zone I was the feed for Zone II Column B.

For Zone II Column A, the two mixed bands, Cu/Dy and Dy/Nd, were collected and mixed with the original feed for Column A. The new mixture was used as the feed for Zone II Column A in Run 2. The loading volume and the flow rate remained the same. The feed of Zone II Column A in Run 3 contained the Cu/Dy and Dy/Nd bands collected from Run 2 mixed with the original feed. In Run 3, the column outputs, the yields, and the component purities remained the same as in Run 2. The results indicated that the system reached a cyclic steady state after Run 3 (Table 4). A similar process was implemented in Zone II Column B for the separation of the Nd/Pr mixed band. The system also reached a cyclic steady state after Run 3. By continuously recycling the mixed bands in the two-zone LAD, little REE in the mixture was lost. The overall yields for all components were over 99%.

TABLE 4

The simulation results for recycling mixed bands in Zone II.

| | Run 1 | | | Run 2 | | | Run 3 | | |
|---|---|---|---|---|---|---|---|---|---|
| | Feed concentration (N) | Yield (%) | Purity (%) | Feed concentration (N) | Yield (%) | Purity (%) | Feed concentration (N) | Yield (%) | Purity (%) |
| Zone II Column A | | | | | | | | | |
| Dy | 0.043 | 69.9 | 99.2 | 0.048 | 77.1 | 99.4 | 0.048 | 77.1 | 99.4 |
| Nd | 0.053 | 87.5 | 99.8 | 0.051 | 89.3 | 99.8 | 0.051 | 89.3 | 99.8 |
| Zone II Column B | | | | | | | | | |
| Nd | 0.086 | 76.7 | 99.3 | 0.087 | 79.7 | 99.5 | 0.087 | 79.7 | 99.5 |
| Pr | 0.074 | 81.3 | 99.6 | 0.072 | 81.3 | 99.6 | 0.072 | 81.3 | 99.6 |

The overall yields and productivities for the three components are summarized in Table 5 and compared to those for the single column design with a fixed breakthrough cut. To achieve an overall REE yield of 9900 and a purity of greater than 99.5% for each component using a similar column length (~1.2 m), the productivity of the single column process is more than two orders of magnitude smaller than that in the two-zone LAD process. The average sorbent productivity for the two-zone design is about 159 times of that of the single column design, 0.7 kg REE/m³/day.

TABLE 5

The comparison between the two-zone design and the single column design.

| | Two-Zone design | | | Single-Zone design | | |
|---|---|---|---|---|---|---|
| Element | Yield (%) | Purity (%) | Average Productivity (kg/m³/day) | Yield (%) | Purity (%) | Average Productivity (kg/m³/day) |
| Dy | >99 | 99.4 | 6.3 | 95.3 | 99.9 | 0.04 |
| Nd | >99 | 99.5 | 92.2 | 99.5 | 99.9 | 0.59 |
| Pr | >99 | 99.6 | 12.0 | 96.7 | 99.9 | 0.08 |
| Overall | >99 | — | 111.5 | 99 | — | 0.7 |

Comparisons Between LAD and Conventional Liquid-Liquid Extraction

The most widely used REE separation technology in industry is multi-stage liquid-liquid extraction. In this process, an organophosphorus extractant dissolved in kerosene is used for extracting REEs from the aqueous phase. Concentrated HCl solutions (up to 6 M) are needed for stripping off REEs from the extractant, and a concentrated ammonia solution is used as a saponification agent. Large fractions of the acid and base used are not recoverable, leading to large amounts of acidic wastewater containing a high concentration of ammonia salts. Moreover, kerosene is flammable, and organophosphorus extractants are toxic.

By contrast, since only environmentally benign chemicals are used in LAD, the safety of the process is much improved, and the environmental impact is much lower. The LAD process generates sodium salt byproducts, which can be converted electrochemically into base and acid. The EDTA-Cu complexes eluting from the column can be easily recovered as EDTA and copper salts. The recovery yields of EDTA and Cu are quite high (>95%). High purity REEs can be precipitated from EDTA-REE complexes using oxalate salts, and the ligand can be recovered with high yields and can be reused. Hence, little waste is generated. Table 6 summarizes the advantages of LAD over the extraction process.

TABLE 6

Comparison between liquid-liquid extraction and two-zone LAD

| | Liquid-liquid extraction | Two-Zone LAD | Advantages of LAD |
|---|---|---|---|
| Typical yield, % | 80-95 | >99 | No loss of REEs |
| Scalability | Difficult to adapt to various feed and scale | Model-based design enables easy adaptability to any feed and scale | More versatile |
| Normalized productivity | 1 | 100 | Much more efficient |
| Normalized processing volume | 100 | 1 | Much smaller |
| Extractant | Toxic organophosphorus compounds | EDTA | Safer |
| Solvents | Flammable organic solvents (kerosene) and water | Water | Safer and cleaner |
| Other Chemicals | High concentration acid (up to 6M) for stripping and ammonia for saponification | Dilute acid, dilute base, $Cu^{2+}$ solution (can be recycled) | Environmentally friendly |
| Waste | 50 tons wastewater per ton REO produced with 2.6 tons ammonium salts, pH = 0.9 | Little | Much less waste |

Rare earth elements are essential for high-technology products. Conventional mining and separation processes for producing high-purity REEs can have large environmental impacts. Recycling REEs from a waste stream such as waste magnets is technically feasible and potentially profitable, and it would reduce the need for mining processes. An environmentally benign separation method, two-zone ligand-assisted displacement chromatography, has been developed for producing high purity REEs with high yields and high productivities.

An improved model based on modulated Langmuir isotherms has been developed and used to simulate the ligand-assisted displacement chromatography accurately for REE feedstocks with no ligand. A general correlation for such feeds was developed for predicting the minimum column length for the formation of a constant-pattern displacement train. A design method based on the correlation was developed. The rate model and the simulations were tested and verified for the literature data for the separation of seven REEs. Moreover, the general correlation was tested and verified with new experimental data for the separation of binary mixtures of Nd and Pr.

A precise zone splitting strategy based on the selectivity-weighted composition factors $\gamma_i$ was developed and tested for two-zone LAD for the separation of a complex mixture of Dy, Nd, and Pr. In the first zone, high purity Nd was obtained with a yield of 78% and a productivity higher than 100 kg/m³/day. A second zone was designed to separate the mixed bands from the first zone to produce all three REEs with high purity and high yield. The overall Nd yield was 95% without recycling the mixed bands in Zone II. Recycling the Nd/Pr and Dy/Nd mixed bands of Zone II can increase the overall yields further to more than 99% for all three REEs. For similar product purity and yield, the overall productivity for this two-zone LAD system was 111 kg REE/(m³ sorbent)/day, more than 100 times higher than that of the single column LAD.

The two-zone LAD requires only a few columns and the productivity is about 100 times higher than the average volume productivity of the conventional liquid-liquid extraction, which requires thousands of mixer-settler units. The LAD separation process uses only environmentally friendly chemicals, most of which can be recycled and reused, generating little waste. The multi-zone LAD method has the potential to transform the REE purification process into a cleaner and "greener" process. The results of this study may also help change the current linear REE economy (from ores to pure REEs, to products, to landfills) to a circular and sustainable REE economy.

Example 2: Two-Zone LBD with Three Columns for the Separation and Recovery of Three High-Purity REEs, Nd, Pr, and Dy, from the REE Mixture of Example 4 (General Strategy 1)

The mixture derived from waste magnets contains three REEs, Pr, Nd, and Dy. The detailed composition is listed in Table B below. A two-zone ligand-based displacement (LBD) separation with 3 columns is designed for recovering all three components, Pr, Nd, and Dy. A REE-selective ligand, EDTA, is immobilized on the sorbent to provide sufficient selectivity for the separation. A monovalent metal ion, $Na^+$, which has a much lower affinity to EDTA, is chosen as the presaturant. An acid, such as HCl, is used as the displacer since the $H^+$ has the highest EDTA affinity. Among the three REEs to be separated, Pr has the lowest EDTA affinity among the three components, hence lowest sorbent selectivity, and will elute first, followed by Nd and then Dy.

TABLE 7

Composition and selectivity weighted composition factor of the crude REEs mixture derived from waste magnets

| Component | Molar fraction ($x_i$) | Selectivity weighted composition factor $y_i$ |
|---|---|---|
| Dy | 0.05 | 0.020 |
| Nd | 0.83 | 0.166 |
| Pr | 0.12 | 0.027 |

General splitting strategy 1 is applied in this case. In this ternary mixture, Nd has the highest $\gamma_i$ value and is recovered first in Zone I. The operation conditions in Zone I are designed to achieve maximum productivity of Nd. Under these conditions, neither Pr nor Dy reaches plateau concentration. Two mixed bands, Pr/Nd and Nd/Dy, are generated from Zone I and further separated in Zone II Columns A and B. The binary mixed bands generated from the effluents of the two columns in Zone II are recycled to the inlet of each column, IIA and IIB, respectively, to increase the yields of all three components to >99%. The simulated elution profiles are shown in FIG. 21A-E. The overall productivity in the three-zone design, 281 kg/m³/day, is 680 times of that in the single column design.

TABLE 8

Yield and productivities for producing all three components from waste magnets using a single column design vs. using a two-zone design

| | Single column design | | Two-zone design | |
|---|---|---|---|---|
| Component | Yield (%) | Productivity (kg/m³ sorbent/day) | Yield (%) | Productivity (kg/m³ sorbent/day) |
| Pr | 97.9 | 0.050 | >99 | 33.7 |
| Nd | 99.6 | 0.359 | >99 | 233.3 |
| Dy | 97.8 | 0.024 | >99 | 14.1 |
| Overall | 99.3 | 0.433 | >99 | 281.1 |

TABLE 9

Simulation parameters for Example 2 Zone 1

| L (cm) | ID (cm) | R (μm) | $\varepsilon_b$ | $\varepsilon_p$ | Feed volume (ml) | Flow rate (ml/min) | Feed concentration (N) | |
|---|---|---|---|---|---|---|---|---|
| 100 | 10 | 56 | 0.40 | 0.3 | 2,420 | 415 | Pr | 0.12 |
| | | | | | | | Nd | 0.83 |
| | | | | | | | Dy | 0.05 |

Isotherm parameters (Constant separation factor isotherm)

$q_{max}$ = 1 meq./mL

| | Component | Separation factor |
|---|---|---|
| 1 | Presaturant | 1 |
| 2 | Pr | 5 |
| 3 | Nd | 9 |
| 4 | Dy | 45 |
| 5 | Displacer | 225 |

Mass transfer parameters

| Component | Brownian diffusivity, $D_b$ (cm²/min) | Pore diffusivity, $D_P$ (cm²/min) | Axial dispersion coefficient, $E_b$ (cm²/min) | Film mass transfer coefficient, $k_f$ (cm/min) |
|---|---|---|---|---|
| All species | $4 \times 10^{-4}$ | $1 \times 10^{-4}$ | Chung and Wen (1968) | Wilson and Geankoplis (1966) |

Numerical parameters (unit: N)

| Axial element | Step size ($L/u_0$) | Collocation points | | Tolerance | |
|---|---|---|---|---|---|
| | | Axial | Particle | Absolute | Relative |
| 151 | 0.01 | 4 | 2 | $5 \times 10^{-6}$ | $10^{-4}$ |

TABLE 10

Simulation parameters for Example 2 Zone II-A

| L (cm) | ID (cm) | R (μm) | $\varepsilon_b$ | $\varepsilon_p$ | Feed volume (ml) | Flow rate (ml/min) | Feed concentration (N) | |
|---|---|---|---|---|---|---|---|---|
| 100 | 10 | 56 | 0.40 | 0.3 | 9,116 | 424 | Pr | 0.158 |
| | | | | | | | Nd | 0.175 |

Isotherm parameters (Constant separation factor isotherm)

$q_{max}$ = 1 meq./mL

| | Component | Separation factor |
|---|---|---|
| 1 | Presaturant | 1 |
| 2 | Pr | 5 |
| 3 | Nd | 9 |
| 4 | Displacer | 45 |

TABLE 10-continued

Simulation parameters for Example 2 Zone II-A

Mass transfer parameters

| Component | Brownian diffusivity, $D_b$ (cm²/min) | Pore diffusivity, $D_P$ (cm²/min) | Axial dispersion coefficient, $E_b$ (cm²/min) | Film mass transfer coefficient, $k_f$ (cm/min) |
| --- | --- | --- | --- | --- |
| All species | $4 \times 10^{-4}$ | $1 \times 10^{-4}$ | Chung and Wen (1968) | Wilson and Geankoplis (1966) |

Numerical parameters (unit: N)

| Axial element | Step size ($L/u_0$) | Collocation points | | Tolerance | |
| --- | --- | --- | --- | --- | --- |
| | | Axial | Particle | Absolute | Relative |
| 151 | 0.01 | 4 | 2 | $1 \times 10^{-5}$ | $10^{-4}$ |

TABLE 11

Simulation parameters for Example 2 Zone II-B

| L (cm) | ID (cm) | R (µm) | $\varepsilon_b$ | $\varepsilon_p$ | Feed volume (ml) | Flow rate (ml/min) | Feed concentration (N) | |
| --- | --- | --- | --- | --- | --- | --- | --- | --- |
| 100 | 10 | 56 | 0.40 | 0.3 | 28,000 | 2,090 | Nd | 0.102 |
| | | | | | | | Dy | 0.100 |

Isotherm parameters (Constant separation factor isotherm)

$q_{max}$ = 1 meq./mL

| | Component | Separation factor |
| --- | --- | --- |
| 1 | Presaturant | 1 |
| 2 | Nd | 5 |
| 3 | Dy | 25 |
| 4 | Displacer | 125 |

Mass transfer parameters

| Component | Brownian diffusivity, $D_b$ (cm²/min) | Pore diffusivity, $D_P$ (cm²/min) | Axial dispersion coefficient, $E_b$ (cm²/min) | Film mass transfer coefficient, $k_f$ (cm/min) |
| --- | --- | --- | --- | --- |
| All species | $4 \times 10^{-4}$ | $1 \times 10^{-4}$ | Chung and Wen (1968) | Wilson and Geankoplis (1966) |

Numerical parameters (unit: N)

| Axial element | Step size ($L/u_0$) | Collocation points | | Tolerance | |
| --- | --- | --- | --- | --- | --- |
| | | Axial | Particle | Absolute | Relative |
| 151 | 0.01 | 4 | 2 | $1 \times 10^{-5}$ | $10^{-4}$ |

Example 3: One-Zone LBD with One Column for the Separation and Recovery of Two Products, Dy and Nd/Pr (as a Mixture), from the REE Mixture of Disclosed Above (General Strategies 2 and 3)

The feedstock mixture and the sorbent in this example are the same as in Example 5. However, the target product in this example is (1) a mixture of Pr and Nd and (2) Dy, instead of three pure products. The Nd/Pr ratio in the waste magnets is similar to that of the virgin magnets. The recovered Nd/Pr can be directly used in making new magnets. One can simplify the purification process and reduce processing costs if Nd and Pr are recovered as a single product. In the design method, Pr and Nd is grouped as one component Pr/Nd and Dy is the other component. The mixture is treated as a binary mixture. The composition and the selectivity-weighted composition factors of this binary mixture is shown in Table C. When calculating the $\gamma_i$ values of the grouped component, Pr/Nd, one should use the selectivities between the presaturant and Pr, and the selectivity between Nd and Dy.

TABLE 12

Composition and selectivity weighted composition factor of the crude REEs mixture derived from waste magnets; Pr and Nd are grouped as one component

| Elements | Pr/Nd | Dy |
|---|---|---|
| Mole fraction ($x_i$) | 0.95 | 0.05 |
| Selectivity weighted composition factor ($y_i$) | 0.317 | 0.020 |

Only a single-zone LBD with one column is needed to recover the two products from this feedstock. The grouped component Pr/Nd has a higher $\gamma_i$ than Dy. Zone I is designed to achieve the maximum productivity for producing Pr/Nd. Dy can be recovered as a pure product in Zone I as well because the purity of collected Dy meets the requirement, 99.5%. The binary mixed band generated from Zone I is recycled to the inlet of this column to prevent any loss of materials, and the yields of both components are greater than 99%. The simulated elution profiles are shown in the FIGS. 23A-B.

The sorbent productivity of this system (with recycle of the mixed band) estimated from the chromatogram shown in FIG. 23B is 1,800 kg REE/m$^3$/day. The productivity is very high because the selectivity between Dy and Nd is very high, $\alpha=5$ (Table 5 above). More importantly, separation of the low-selectivity pair, Nd and Pr, $\alpha=1.8$, is not required in this separation as in Example 4, leading to the high sorbent productivity. Recall the productivity of the single column design for the separation of Nd, Pr, and Dy with high purity (>99.5%) and high yields (>99%) for all three REEs is only 0.4 kg REE/m$^3$/day (Table 8, Example 5). In general, the higher the selectivity weighted composition factor $\gamma_i$ for the target product component i, the higher the sorbent productivity. The higher the purity requirement, the lower the sorbent productivity.

Example 4: Combined LAD (Zones I and II) and LBD (Zone III) for the Separation of Four REEs and Co from a Crude Mixture Derived from Waste Magnets (General Splitting Strategy 1 for LAD and General Strategy 2 for LBD)

Example 7 demonstrates the process of recovery of three REEs (Dy, Nd, and Pr) and Co from a crude mixture derived from waste magnets. Waste magnets are first converted into soluble metal salts in an aqueous solution. The majority component Fe in the soluble salts of the waste magnets are precipitated by adjusting the solution pH and removed via filtration. REEs and Co ions, which remain in the solution, can be separated and recovered. A three-zone design is developed for recovering Co and three REEs (FIG. 24A).

A cation exchange column is used as the loading column, Zone I-A. For the cation exchanger, trivalent ions have higher affinity than divalent metal ions. When the REE and Co mixture is fed into this column, the trivalent REEs ions will retain in the column while other divalent metal ions will be displaced by the trivalent ions and eluted earlier from the column. The simulated elution profile for Zone I-A is shown in the drawings. The REE-loaded column, Zone I-A, is then connected to a Cu-loaded column to proceed with REEs separation process using two-zone LAD. The LAD separation design strategy is the same as in Example 4. Three pure REEs are produced.

The early eluting divalent metal ions from Zone I-A are collected and sent to Zone III to recover Co with LBD. Zone III uses an iminodiacetic acid (IDA) column which has high selectivities among divalent metal ions. The affinity sequence for the IDA column is Cu>Ni>Co>B. A displacement separation is designed to recover Co as a product. Na$^+$ is used as the presaturant and H$^+$ is used as the displacer. The simulated elution profiles are shown in FIG. 24C.

Theoretical Details

A. Separation Mechanism in Ligand-Assisted Displacement (LAD) Chromatography

A schematic of the separation mechanism of ligand-assisted displacement chromatography for a binary mixture is shown. The cation exchange resin is first pre-equilibrated with a presaturant (P), in this case, copper ions (Cu$^{2+}$). The presaturant should have a lower affinity to the sorbent but a higher affinity to the ligand than the REEs. When a mixture of REE ions (Nd$^{3+}$ and Pr$^{3+}$) is fed into the column, the trivalent REE ions displace the divalent Cu$^2$. Because the sorbent selectivities for the REE ions are quite small (<1.1), no separation occurs during the loading and a uniform REE mixture band forms near the inlet of the column.

When a solution of the EDTA ligand is fed into the column, EDTA competes with the sorbent to form a non-adsorbing ligand-REE (L-REE) complex. Each complex moves with the mobile phase down the column, resulting effectively in the displacement of the REEs by Na$^+$. Since EDTA has a higher selectivity for Nd$^{3+}$ than for Pr$^{3+}$, the L-Nd complex will move ahead of the L-Pr complex, resulting in the separation of the Nd band from the Pr band. When the L-Nd reaches the boundary between the Nd band and the Cu band, the ligand releases Nd$^{3+}$ to form a complex with Cu$^{2+}$, since Cu$^{2+}$ has the highest affinity for EDTA. Then, the released Nd$^{3+}$ ions re-adsorb onto the column. As more ligand is fed in the column, the L-Pr complex reaches the boundary between the Pr and Nd bands. Similarly, Pr$^{3+}$ is released from the ligand and re-adsorbs onto the sorbent. As the adsorbed Nd ions desorb and form complexes with the ligand, the Nd band is displaced by the Pr band. If the column is sufficiently long, this displacement process will continue until two successive bands of Nd and Pr are formed, moving in the column with the same velocity. The separation of the two bands is driven by the EDTA as the apparent displacer. In ideal cases, with no mass transfer effects, this set of bands is called an "isotachic train". In non-ideal cases, the overlapping regions between adjacent bands shrink as the bands continue to separate. Eventually, as each mass transfer zone reaches a constant length, the system reaches a "constant-pattern" state.

B. Isotachic Train, Constant-Pattern Isotachic Train, and General Map

If the sorbent has selectivities $\alpha_{ij}^{sorbent}$ then the effective selectivity, $\alpha_{ij}^e$, is equal to the ratio of $\alpha_{ij}^{sorbent}$ to the ligand selectivity $\alpha_{ij}^{ligand}$, Eq. (A1). When the sorbent selectivity is negligible, then the effective selectivity is equal to the inverse of the ligand selectivity.

$$\alpha_{ij}^e = \frac{\alpha_{ij}^{sorbent}}{\alpha_{ij}^{ligand}} \quad (A1)$$

For ideal systems (with no spreading due to mass transfer) the minimum column length to form an isotachic train in LAD was first derived using h-transformation theory.

For nonideal systems, the constant-pattern mass transfer zone length ($L_{MTZ,CP}$) is $$\frac{L_{MTZ,CP}}{L_C} = L_f k_f^* \left(\frac{\alpha^e + 1}{\alpha^e - 1}\right) \ln\left(\frac{1-\theta}{\theta}\right) \quad (A2)$$

where $L_c$ is the column length, $L_f$ is the loading fraction, $k_f^*$ is the dimensionless overall mass transfer coefficient, $\theta$ is the breakthrough cut.

The loading fraction ($L_f$) is defined as $$L_f = \frac{L_{feed}}{L_C} = \frac{(c_F V_F/q_{max} A_c)}{L_c} = \frac{C_F V_F}{q_{max} A_c L_c} = \frac{C_F V_F}{q_{max} V_c} \quad (A3)$$

where $c_F$ is the total feed concentration, $V_F$ is the feed volume, $q_{max}$ is the sorbent capacity based on column volume, and $A_c$ is the cross-sectional area.

The dimensionless overall mass transfer coefficient ($k_f^*$) depends on three dimensionless variables.

$$\frac{1}{k_f^*} = \frac{1}{N_f} + \frac{1}{Pe_b} + \frac{1}{15 N_D} \quad (A4)$$

where $N_f$ is the ratio of film mass transfer rate to the convection rate $$N_f = \frac{3L_C}{R_p} \frac{(1-\varepsilon_b) k_f}{\varepsilon_b u_0} \quad (A5)$$

$Pe_b$ is the Peclet number, which is the ratio of the axial convection rate to the axial dispersion rate. When the Reynolds number is smaller than 1, the axial dispersion coefficient is simplified to $E_b = 10\varepsilon_b R_p u_0$ $$Pe_b = \frac{L_c u_0}{E_b} = \frac{L_c u_0}{10\varepsilon_b R_p u_0} = \frac{L_c}{10\varepsilon_b R_p} \quad (A6)$$

$N_D$ is the ratio of intraparticle diffusion rate to the convection rate.

$$N_D = \frac{K_{se}(1-\varepsilon_b)\varepsilon_p D_p L_C}{\varepsilon_b u_0 R_p^2} \quad (A7)$$

where $R_p$ is the particle radius, $\varepsilon_b$ is the bed void fraction, $\varepsilon_p$ is the particle porosity, $k_f$ is the film mass transfer coefficient, $u_0$ is the linear velocity, $K_{se}$ is the size exclusion factor, $D_p$ is the intraparticle diffusivity.

The length of the constant-pattern mass transfer zone $L_{MTZ,CP}$ is:

$$L_{MTZ,CP} = u_d t_{MTZ,CP} \quad (A8)$$

where $t_{MTZ,CP}$ is the elution time of the constant-pattern mass transfer zone, and $u_d$ is the velocity of the displacer, $$u_d = \frac{u_0}{1+K_d} \quad (A9)$$

The nonlinear distribution coefficient $K_d$ is $$K_d = P\varepsilon_p + \frac{\Delta q}{\varepsilon_b \Delta c} = P\varepsilon_p + \frac{q_d}{\varepsilon_b c_d} \quad (A10)$$

where the phase ratio P is defined as $$P = \frac{1-\varepsilon_b}{\varepsilon_b},$$

$\varepsilon_b$ is the bed void fraction, $\varepsilon_p$ is the particle porosity, $\Delta q$ is the change in the stationary phase concentration, $\Delta c$ is the change in mobile phase concentration, $q_d$ is the adsorbed concentration of displacer and $c_d$ is the displacer concentration in the mobile phase. $K_d$ is usually larger than 1.

The minimum column length required to form a constant-pattern isotachic train $L_{iso-nid}$ was correlated to several key dimensionless groups. Rate model simulations were used to find $L_{iso-nid}$ values. A dimensionless column length, p, is the ratio of the column length in a non-ideal system to the minimum column length needed to form an isotachic train in an ideal system. If the column length is fixed, $\phi$ is the ratio of ideal loading fraction to the non-ideal loading fraction.

A combination of the key dimensionless groups was used to reduce the multi-dimensional design parameter space to two dimensions, $\phi$ as a function of X, where X is the product of the key dimensionless groups that control the mass transfer zone length.

$$X = L_f k_f^* \left(\frac{\alpha^e - 1}{\alpha^e + 1}\right) \quad (A11)$$

where $L_f$ is the loading fraction, $k_f^*$ is the dimensionless overall mass transfer coefficient, $a^e$ is the effective selectivity. The minimum dimensionless column length $\phi_{min}$ that is required to reach a constant-pattern state is related to X with a general correlation, which divides the two-dimensional space into two distinct regions, a constant-pattern region and a transient pattern region. Operating in the first region can result in high product concentrations and high yields of high purity products.

A constant separation factor isotherm is used to simulate the LAD process:

$$q_i = \frac{q_{max}\alpha_{i,ref}^e C_{p,i}}{\sum_{j=1}^{N} \alpha_{j,ref}^e C_{p,j}} \quad (A12)$$

where $q_i$ is the sorbent phase concentration of component "i", $q_{max}$ is the sorbent capacity, and this capacity is the same for all REEs in LAD systems, $\alpha_{i,ref}^e$ is the effective selectivity between component "i" and the reference component, $C_{p,i}$ is the concentration of component "i" in the mobile phase.

In the rate model simulations based on constant separation factors, it was assumed that the sorbent has significant selectivities for REEs during loading. This assumption was inaccurate for feed solutions with no chelating agent. Because most sorbents have negligible selectivities for the REEs, no partial separation will occur during the loading before the ligand is introduced into the column. New rate model simulations were done to improve the accuracy of the general correlation.

The multi-component Langmuir isotherm, Eq. (A13) is equivalent to the constant separation factor isotherm, and is expressed as:

$$q_i = \frac{a_i C_{p,i}}{1 + \sum_{j=1}^{N} b_j C_{p,j}} \quad (A13)$$

If the sorbent capacity for each component is the same and the $b_j C_{p,j}$ terms are much larger than 1, Eq. (A13) is simplified to $$q_i = \frac{a_i C_{p,i}}{\sum b_j C_{p,j}} \quad (A14)$$

and $$q_{max} = \frac{a_i}{b_i} \quad (A15)$$

This simplified isotherm is equivalent to the constant separation factor isotherm Eq. (A12) where the selectivity is defined as $$\alpha_{i,ref}^e = \frac{a_i}{a_{ref}} \quad (A16)$$

To simulate the process in which the separation factors change after a ligand is introduced, a modulated Langmuir isotherm is used:

$$q_i = \frac{a_{0,i} e^{-S_{a_i} c_m} C_{p,i}}{1 + \sum b_{0,j} e^{-S_{b_j} c_m} C_{p,j}} \quad (A17)$$

In this equation the values of the effective Langmuir "a" and "b" parameters vary with the modulator concentration $c_m$ by the exponential terms, $e^{-S_{a_i} c_m}$ and $e^{-S_{b_j} c_m}$.

When the $b_j C_{p,j}$ terms are much larger than 1, the isotherm can be simplified to $$q_i = \frac{a_{0,i} e^{-S_{a_i} c_m} C_{p,i}}{\sum b_{0,j} e^{-S_{b_j} c_m} C_{p,j}} \quad (A18)$$

where $a_{0,i}$ and $b_{0,j}$ are the effective Langmuir "a" and "b" values at an initial modulator concentration. In LAD systems, the capacity of all components is the same. Then, the ratio between the overall Langmuir "a" and "b" values is the same. During loading, the modulator concentration $c_m$ is set to 0. Then the isotherm is simplified to:

$$q_i = \frac{a_{0,i} c_{P,i}}{\sum b_{0,j} c_{P,j}} \quad (A19)$$

The sorbent capacity is:

$$q_{max} = \frac{a_{0,i}}{b_{0,i}} (i = 1, 2, \ldots, N) \quad (A20)$$

The effective selectivity is $$\alpha_{i,j}^e = \frac{a_{0,i}}{a_{0,j}} \quad (A21)$$

If there is no selectivity between the two components during loading, then $a_{0,i} = a_{0,j}$. The effective selectivity between the presaturant $Cu^{2+}$ and the fastest eluting REE (the one with the highest affinity for the ligand) was approximated as 5 in the simulations. Such a high selectivity is sufficient for predicting the sharp wave between the two species.

The separation begins after the ligand is introduced into the column. Because each REE has a different affinity for the ligand, the modulator concentration $c_m$ in the exponential term changes to 1 when the ligand is fed into the column, resulting in a substantial selectivity.

$$q_i = \frac{a_{0,i} e^{-S_{a_i}} c_{P,i}}{\sum b_{0,j} e^{-S_{b_j}} c_{P,j}} \quad (A22)$$

Since the capacity remains the same, the ratio between the overall Langmuir "a" and "b" values should be the same.

$$q_{max} = \frac{a_{0,i}}{b_{0,i}} = \frac{a_{0,i} e^{-S_{a_i}}}{b_{0,i} e^{-S_{b_i}}} \quad (A23)$$

Therefore, $S_{a_i} = S_{b_i}$.
Thus, the selectivity can be expressed as $$\alpha_{i,j}^e = \frac{a_{0,i} e^{-S_{a_i}}}{a_{0,j} e^{-S_{a_j}}} = \frac{a_{0,i}}{a_{0,j}} e^{S_{a_j} - S_{a_i}} \quad (A24)$$

If the REEs have no selectivity during loading, then $a_{0,i} = a_{0,j}$. Therefore, $\alpha_{i,j}^e = e^{-S_{a_j} - a_i}$. The values of $S_a$ are chosen so that $S_{a_j} - S_{a_i} = \ln \alpha_{i,j}^e$, and the selectivity is activated after the modulator concentration is changed from 0 to 1.

The simulations based on the new isotherms were used to find the minimum column length to reach a constant pattern in non-ideal binary systems. In each case, two REEs (REE1 and REE2) were separated using LAD. The sorbent had a negligible selectivity for these elements. REE1 had a higher affinity to the ligand, resulting in a lower effective sorbent selectivity, and is eluted ahead of REE2. Various virtual binary systems with a 2-meter long column were simulated. A range of X values (from 8 to 41) was obtained by varying the flow rate and the effective selectivity between the two REEs.

The value of $a^e$ was varied from 1.5 to 10. The effective selectivity between REE1 and the presaturant was set to 5, and the effective selectivity between the ligand (EDTA-Na) and REE2 was also set to 5 to simulate the sharp displacement waves. The effective capacity, the ratio between $a_0$ and $b_0$, in these systems was 1.45 meq/ml bed volume. The isotherm parameters for the virtue binary systems are given in A5, Table 7.

The minimum column length to reach the constant-pattern mass transfer zone length for each binary system was identified from the column profiles, when the simulated mass transfer zone length remained fixed with increasing column length. The minimum column lengths were then divided by the ideal column length to form an isotachic train in corresponding ideal systems. The dimensionless column length $\phi$ was plotted against the different X values.

A best-fitting curve for the data points was found and plotted. This plot is a general map for predicting whether a non-ideal system is in the constant-pattern region. In the non-linear regression to fit the exponential expression for the curve, the constant term was fixed at 1, because as the X value approaches infinity, the system approaches an ideal system, and the minimum column length approaches that for an ideal system. The new correlation of $\phi_{min}$ as a function of X is given below.

$$\phi_{min} = 1 + 1.5 e^{-\frac{X}{9.8}} \tag{A25}$$

C. Yield and Productivity in Constant-Pattern Design Method for Multi-Component Mixtures A dimensionless yield equation is given by:

$$Y_i = 1 - \frac{\beta}{2 x_i L_f k_f^*} \left( \frac{\alpha_{i,i-1}^e + 1}{\alpha_{i,i-1}^e - 1} + \frac{\alpha_{i+1,i}^e + 1}{\alpha_{i+1,i}^e - 1} \right) = 1 - \frac{\beta}{2 \gamma_i L_f k_f^*} \tag{A26}$$

where $x_i$ is the molar fraction of component "i" in the feed mixture, $$\beta = \ln\left(\frac{1-\theta}{\theta}\right)$$

and $\theta$ is the breakthrough cut, and $\gamma_i$ is selectivity weighted composition factor, which is defined as:

$$\gamma_i = \frac{x_i}{\frac{\alpha_{i,i-1}^e + 1}{\alpha_{i,i-1}^e - 1} + \frac{\alpha_{i+1,i}^e + 1}{\alpha_{i+1,i}^e - 1}} \tag{A27}$$

The sorbent productivity $P_{R,i}$ for component i in a LAD system (the amount of REEs produced per unit sorbent volume per unit time) was derived previously.

$$P_{R,i} = \frac{\varepsilon_b c_d u_0 x_i L_f}{L_c}\left(1 - \frac{\beta}{2\gamma_i L_f k_f^*}\right) \tag{A28}$$

To maximize the productivity in a given system, one can scan a range of linear velocities ($u_0$). For each $u_0$, the overall dimensionless mass transfer coefficient $k_f^*$ is calculated using Eq. (A4). $L_{f,id}$ is calculated using the h-transformation theory.[2] For a constant-pattern design with the minimum column length, the ratio between $L_{f,id}$ and the $L_f$ is equal to $\phi_{min}$. The loading fraction is then found from the $\phi_{min}$ value, Eq. (A25). The productivity for each linear velocity ($u_0$) is then calculated. An algorithm flowchart is shown.

For a ternary mixture of Dy, Nd and Pr with molar fractions 0.05, 0.83, and 0.12, respectively, the design results for yield and productivity as a function of the linear velocity are shown. The highest productivity, 120 kg Nd/m³ sorbent/day was found at a yield of 77.5%.

D. Relation Between Yield, Purity, and Breakthrough Cut $\theta$ in the Constant-Pattern Design In collecting products from a column effluent, a breakthrough cut $\theta$, which controls the width of a product band, is defined as the ratio of the lowest concentration $c_{bot}$ to the maximum band concentration $c_d$. The cut controls the yield of the product component as it determines the amount in the collected product relative to the total amount of this component in the feed. It also controls the purity of the product because it determines the amount of the impurities from the adjacent bands.

The product collected is the band region between the two mass transfer zones. From the elution profile, the yield of component i is calculated as $$Y_i = \frac{c_d t_i Q_f}{c_{f,i} V_f} \tag{A29}$$

where $c_d$ is the band concentration ti is the time for collecting the product band, $Q_f$ is the flow rate, $c_{f,i}$ is the concentration of component i in the feed, and $V_f$ is the total feed volume.

To calculate the purity of the product, the amount of the impurities from the two adjacent bands is calculated first. The impurities from the adjacent band on the right-hand-side is enlarged and shown. It is difficult to find an analytical function that can describe the change in concentration over time, but the elution time corresponding to mass transfer zone length, $t_{MTZ,CP}$, is related to $\theta$, through the analytical solution, Eq. (A2) and Eq. (A8).

Combining Eq. (A2) and Eq. (A8) gives:

$$t_{MTZ,CP} = \frac{L_{MTZ,CP}}{u_d} = \frac{L_c L_f k_f^*}{u_d}\left(\frac{\alpha^e + 1}{\alpha^e - 1}\right)\ln\left(\frac{1-\theta}{\theta}\right) \tag{A30}$$

The elution time as a function of $\theta$ is expressed as:

$$t(\theta) = \tfrac{1}{2} t_{MTZ,\theta} - \tfrac{1}{2} t_{MTZ,\theta_d} \tag{A31}$$

The area within the curve region is found from $$S = c_d \int_{\theta_0}^{\theta_d} t(\theta) d\theta \tag{A32}$$

where $\theta_0$ is a very small breakthrough cut (almost 0), and $\theta_d$ is the breakthrough cut in the design.

Combining Eq. (A30) and Eq. (A31), $t(\theta)$ is:

$$t(\theta) = \frac{1}{2}\frac{L_c}{u_0}\frac{K_d}{k_f^*}\left(\frac{\alpha^e+1}{\alpha^e-1}\right)\left(\ln\left|\frac{1-\theta}{\theta}\right| - \ln\left|\frac{1-\theta_d}{\theta_d}\right|\right) \quad (A33)$$

Then the area is expressed as $$S = c_d Q_f \int_{\theta_0}^{\theta_d} t(\theta)d\theta = \quad (A34)$$

$$\frac{c_d Q_f}{2}\frac{L_c}{u_0}\frac{K_d}{k_f^*}\left(\frac{\alpha^e+1}{\alpha^e-1}\right)\int_{\theta_0}^{\theta_d}\left(\ln\left|\frac{1-\theta}{\theta}\right| - \ln\left|\frac{1-\theta_d}{\theta_d}\right|\right)d\theta$$

We define the term k as $$k \equiv \frac{c_d Q_f}{2}\frac{L_c}{u_0}\frac{K_d}{k_f^*}\left(\frac{\alpha^e+1}{\alpha^e-1}\right) \quad (A35)$$

and $\beta_d$ is defined as $$\beta_d \equiv \ln\left|\frac{1-\theta_d}{\theta_d}\right| \quad (A36)$$

Then $$S = k\int_{\theta_0}^{\theta_d}\left(\ln\left|\frac{1-\theta}{\theta}\right| - \beta_d\right)d\theta = k\left[\theta\cdot\ln\frac{1-\theta}{\theta} - \beta_d\theta - \ln(1-\theta)\right]\bigg|_{\theta_0}^{\theta_d} = \quad (A37)$$

$$k\left[\ln\frac{1-\theta_0}{1-\theta_d} + \beta_d\theta_0 - \theta_0\cdot\ln\frac{1-\theta_0}{\theta_0}\right]$$

In the limit of $\theta_0 \to 0$ $$S = k\left[\ln\frac{1-\theta_0}{1-\theta_d} + \beta_d\theta_0 - \theta_0\cdot\ln\frac{1-\theta_0}{\theta_0}\right] = -k\ln(1-\theta_d) \quad (A38)$$

The amounts of the impurities from the two adjacent bands $S_{left}$ and $S_{right}$ are calculated using Eq. (A38). The purity Put is calculated from the two areas and the total area of the collected product:

$$Pu_i = \frac{c_d t_i Q_f - S_{left} - S_{right}}{c_d t_i Q_f} = 1 + \frac{\ln(1-\theta_d)}{c_d t_i Q_f}(k_{left} + k_{right}) \quad (A39)$$

To link the yield with the purity and the cut, the k term is simplified first by substituting the $Q_f$ and the $K_d$:

$$k = \frac{c_d Q_f}{2}\frac{L_c}{u_0}\frac{K_d}{k_f^*}\left(\frac{\alpha^e+1}{\alpha^e-1}\right) = \quad (A40)$$

$$\frac{c_d u_0 \varepsilon_b A_c}{2}\frac{L_c}{u_0}\frac{\frac{q_d}{\varepsilon_b c_d}}{k_f^*}\left(\frac{\alpha^e+1}{\alpha^e-1}\right) = \frac{L_c A_c q_d}{2k_f^*}\left(\frac{\alpha^e+1}{\alpha^e-1}\right)$$

where $A_c$ is the cross-sectional area of the column.
The loading fraction $L_f$ is $$L_f = \frac{c_f V_f}{L_c A_c q_d} \quad (A41)$$

where $c_f$ is the total feed concentration.
The purity is related to yield and the breakthrough cut $\theta_d$ by combining Eqs. (A29), (A40), and (A41):

$$Pu_i = 1 + \left(\frac{1}{Y_i} - 1\right)\frac{\ln(1-\theta_d)}{\beta_d} \quad (A42)$$

This equation indicates that for a single column design, only two out of the three variables (purity, yield, and breakthrough cut $\theta$) can be independently specified.

E. System and Simulation Parameter Tables

TABLE 7

Simulation parameters for generating a binary LAD system, a values varied between 1.5 to 10.

| | Component | $a_0$ | $b_0$ | $S_a$ | $S_b$ | $\alpha_{i,2}$ |
|---|---|---|---|---|---|---|
| 1 | Modulator | 0 | 0 | 0 | 0 | |
| 2 | Presaturant | 1,450 | 1,000 | 0 | 0 | 1 |
| 3 | REE1 | 7,250 | 5,000 | 0 | 0 | 5 |
| 4 | REE2 | 7,250 | 5,000 | $-\ln(\alpha)$ | $-\ln(\alpha)$ | $5\alpha$ |
| 5 | Ligand | 7,250 | 5,000 | $-\ln(5\alpha)$ | $-\ln(5\alpha)$ | $25\alpha$ |

TABLE 8

Experimental conditions and simulation parameters for the verification of the improved general map

| L (cm) | ID (cm) | R (μm) | $\varepsilon_b$ | $\varepsilon_p$ | $C_{f,i}$ (N) | Experiment # | X value | Feed volume (ml) | $Q_f$ (mL/min) |
|---|---|---|---|---|---|---|---|---|---|
| 38 | 1.16 | 63 | 0.4 | 0.28 | 0.3 | 1 | 8.40 | 24.3 | 1.73 |
| | | | | | | 2 | 10.52 | 26.7 | 1.47 |
| | | | | | | 3 | 14.04 | 29.3 | 1.19 |
| | | | | | | 4 | 20.98 | 33.9 | 0.88 |
| | | | | | | 5 | 32.15 | 37.7 | 0.60 |

| Isotherm parameters (Modulated Langmuir isotherm) | | | | |
|---|---|---|---|---|
| Component | a | b | Sa | Sb |
| 1 Modulator | 0 | 0 | 0 | 0 |
| 2 Cu | 1380 | 1000 | 0 | 0 |

TABLE 8-continued

Experimental conditions and simulation parameters for the verification of the improved general map

| 3 | Nd | 6900 | 5000 | 0 | 0 |
| 4 | Pr | 6900 | 5000 | −0.58779 | −0.58779 |
| 5 | EDTA-Na | 6900 | 5000 | −2.19722 | −2.19722 |

Mass transfer parameters

| Component | Brownian diffusivity, $D_b$ (cm$^2$/min) | Pore diffusivity, $D_p$ (cm$^2$/min) | Axial dispersion coefficient, $E_b$ (cm$^2$/min) | Film mass transfer coefficient, $k_f$ (cm/min) |
| --- | --- | --- | --- | --- |
| All species | $1 \times 10^{-4}$ | $9 \times 10^{-5}$ | | |

Numerical parameters (unit: N)

| Axial element | Step size ($L/u_0$) | Collocation points | | Tolerance | |
| | | Axial | Particle | Absolute | Relative |
| --- | --- | --- | --- | --- | --- |
| 151 | 0.01 | 4 | 2 | $1 \times 10^{-4}$ | $1 \times 10^{-3}$ |

TABLE 9

Experimental conditions for the separation of Zone I

| Ligand | L (cm) | ID (cm) | R (μm) | $\varepsilon_b$ | $\varepsilon_p$ | Feed volume (ml) | Flow rate (ml/min) | Feed concentration (N) |
| --- | --- | --- | --- | --- | --- | --- | --- | --- |
| 0.09M pH = 9 | 127 | 1.16 | 63 | 0.40 | 0.28 | 56 | 5.3 | Dy: 0.05 Nd: 0.83 Pr: 0.12 |

Isotherm parameters (Modulated Langmuir isotherm)

| Component | a | b | Sa | Sb | Selectivity $\alpha_{i,\,i-1}$ |
| --- | --- | --- | --- | --- | --- |
| 1 | Modulator | 0 | 0 | 0 | 0 | — |
| 2 | Cu | 1360 | 1000 | 0 | 0 | 1 |
| 3 | Dy | 6800 | 5000 | 0 | 0 | 5 |
| 4 | Nd | 6800 | 5000 | −1.60944 | −1.60944 | 5 |
| 5 | Pr | 6800 | 5000 | −2.19723 | −2.19723 | 1.8 |
| 6 | EDTA-Na | 6800 | 5000 | −3.80666 | −3.80666 | 5 |

Mass transfer parameters

| Component | Brownian diffusivity, $D_b$ (cm$^2$/min) | Pore diffusivity, $D_P$ (cm$^2$/min) | Axial dispersion coefficient, $E_b$ (cm$^2$/min) | Film mass transfer coefficient, $k_f$ (cm/min) |
| --- | --- | --- | --- | --- |
| All species | $4 \times 10^{-4}$ | $9 \times 10^{-5}$ | | |

Numerical parameters (unit: N)

| Axial element | Step size ($L/u_0$) | Collocation points | | Tolerance | |
| | | Axial | Particle | Absolute | Relative |
| --- | --- | --- | --- | --- | --- |
| 151 | 0.01 | 4 | 2 | $5 \times 10^{-6}$ | $10^{-3}$ |

TABLE 10

Experimental conditions for the separation of Zone II Column A

| Ligand | L (cm) | ID (cm) | R (μm) | $\varepsilon_b$ | $\varepsilon_p$ | Feed volume (ml) | Flow rate (ml/min) | Feed concentration (N) |
|---|---|---|---|---|---|---|---|---|
| 0.09M pH = 9 | 89 | 1.16 | 63 | 0.40 | 0.28 | 451.5 | 5.40 | Dy: 0.043 Nd: 0.053 |

Isotherm parameters (Constant Separation Factor Isotherm)

$q_{max}$ (eq./L) 1.35

| Component | | Selectivity α |
|---|---|---|
| 1 | Cu | 1 |
| 2 | Dy | 5 |
| 3 | Nd | 25 |
| 4 | EDTA-Na | 125 |

Mass transfer parameters

| Component | Brownian diffusivity, $D_b$ (cm²/min) | Pore diffusivity, $D_p$ (cm²/min) | Axial dispersion coefficient, $E_b$ (cm²/min) | Film mass transfer coefficient, $k_f$ (cm/min) |
|---|---|---|---|---|
| All species | $4 \times 10^{-4}$ | $9 \times 10^{-5}$ | | |

Numerical parameters (unit: N)

| Axial element | Step size ($L/u_0$) | Collocation points Axial | Collocation points Particle | Tolerance Absolute | Tolerance Relative |
|---|---|---|---|---|---|
| 151 | 0.01 | 4 | 2 | $5 \times 10^{-6}$ | $10^{-3}$ |

TABLE 11

Experimental conditions for the separation of Zone II Column B

| Ligand | L (cm) | ID (cm) | R (μm) | $\varepsilon_b$ | $\varepsilon_p$ | Feed volume (ml) | Flow rate (ml/min) | Feed concentration (N) |
|---|---|---|---|---|---|---|---|---|
| 0.09M pH = 9 | 89 | 1.16 | 63 | 0.40 | 0.28 | 137.4 | 1.36 | Nd: 0.086 Pr: 0.074 |

Isotherm parameters (Constant Separation Factor Isotherm)

$q_{max}$ (eq./L) 0.95

| Component | | Selectivity α |
|---|---|---|
| 1 | Cu | 1 |
| 2 | Nd | 5 |
| 3 | Pr | 9 |
| 4 | EDTA-Na | 45 |

Mass transfer parameters

| Component | Brownian diffusivity, $D_b$ (cm²/min) | Pore diffusivity, $D_p$ (cm²/min) | Axial dispersion coefficient, $E_b$ (cm²/min) | Film mass transfer coefficient, $k_f$ (cm/min) |
|---|---|---|---|---|
| All species | $4 \times 10^{-4}$ | $9 \times 10^{-5}$ | | |

Numerical parameters (unit: N)

| Axial element | Step size ($L/u_0$) | Collocation points Axial | Collocation points Particle | Tolerance Absolute | Tolerance Relative |
|---|---|---|---|---|---|
| 151 | 0.01 | 4 | 2 | $5 \times 10^{-6}$ | $10^{-3}$ |

TABLE 12

Simulation parameters for the Moore's chromatogram

System parameters

| L (cm) | ID (cm) | R (μm) | $\varepsilon_b$ | $\varepsilon_p$ | Feed volume (L) | Feed concentration for all component (mN) | Flow rate (ml/min) |
|---|---|---|---|---|---|---|---|
| 40 | 2.2 | 112.5 | 0.35 | 0.45 | 1 | 33 | 3.8 |

Isotherm parameters (Modulated Langmuir isotherm)

| Component | | a | b | Sa | Sb | Selectivity $\alpha_{i-1, i}$ |
|---|---|---|---|---|---|---|
| 1 | Modulator | 0 | 0 | 0 | 0 | — |
| 2 | Er | 1920 | 1000 | 0 | 0 | 1 |
| 3 | Ho | 2112 | 1100 | −0.66783 | −0.66783 | 1.95 |
| 4 | Dy | 2112 | 1100 | −1.36098 | −1.36098 | 2 |
| 5 | Tb | 2112 | 1100 | −2.35423 | −2.35423 | 2.7 |
| 6 | Gd | 2112 | 1100 | −3.60699 | −3.60699 | 3.5 |
| 7 | Eu | 2112 | 1100 | −3.94346 | −3.94346 | 1.4 |
| 8 | Sm | 2112 | 1100 | −4.47409 | −4.47409 | 1.7 |
| 9 | EDTA-Na | 2112 | 1100 | −6.08353 | −6.08353 | 5 |

Mass transfer parameters

| Component | Brownian diffusivity, $D_b$ (cm$^2$/min) | Pore diffusivity, $D_p$ (cm$^2$/min) | Axial dispersion coefficient, $cE_b$ (cm$^2$/min) | Film mass transfer coefficient, $k_f$ (cm/min) |
|---|---|---|---|---|
| All species | $4 \times 10^{-4}$ | $5 \times 10^{-5}$ | | |

Numerical parameters (unit: N)

| Axial element | Step size ($L/u_0$) | Collocation points | | Tolerance | |
|---|---|---|---|---|---|
| | | Axial | Particle | Absolute | Relative |
| 151 | 0.01 | 4 | 2 | $10^{-3}$ | $10^{-3}$ |

| Variables | Definition |
|---|---|
| $\alpha^e$ | Effective sorbent selectivity |
| $\alpha_{ij}^{sorbent}$ | Sorbent selectivity between component i and j |
| $\alpha_{ij}^{ligand}$ | Ligand selectivity between component i and j |
| $\gamma_i$ | Selectivity weighted composition factor |
| $\varepsilon_b$ | Bed void fraction |
| $\varepsilon_p$ | Particle porosity |
| $\theta$ | Breakthrough cut [35,36] |
| $\phi$ | Dimensionless column length relative to the minimum column length required to form an isotachic train in an ideal system |
| $c_d$ | Effective ligand concentration (N) |
| $C_f$ | Feed concentration (N) |
| $D_{b,i}$ | Brownian diffusivity of component i (cm$^2$/min) |
| $D_{p,i}$ | Pore diffusivity of component i (cm$^2$/min) |
| ID | Column internal diameter (cm) |
| $k_f^*$ | Dimensionless overall mass transfer coefficient |
| $L_C$ | Column length (cm) |
| $L_f$ | Loading fraction |
| $L_{MTZ}$ | Mass transfer zone length (cm) |
| $L_{MTZ,CP}$ | Constant-pattern mass transfer zone length (cm) |
| $\Delta P_{max}$ | Maximum pressure drop |
| $q_{max}$ | Effective sorbent capacity (eq./L) |
| $u_0$ | Linear velocity (cm/min) |
| $V_f$ | Feed loading volume (mL) |
| $x_i$ | Molar fraction of component i |
| X | Product of $L_f$, $k_f^*$, and $\dfrac{\alpha^e - 1}{\alpha^e + 1}$ |

Table 13—Nomenclature

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A method of recovering pure rare earth elements (REEs) from magnets, comprising:
   a.) dissolving a magnet to yield a solution containing Nd, Pr, and Dy;
   b.) equilibrating a first column with a presaturant to yield a first equilibrated column;
   c.) introducing the solution to the first equilibrated column;
   d.) introducing a first ligand solution to the first equilibrated column;

e.) establishing three moving bands of different liquid compositions in the column, wherein the three bands comprise a Dy/Nd mixed band, a first pure Nd band, and a Nd/Pr mixed band;

f.) sending the Dy/Nd mixed band to a second column containing the presaturant;

g.) introducing a second ligand solution to the second column;

h.) establishing a pure Dy band and a second pure Nd band in the second column;

i.) sending the Nd/Pr mixed band to a third column containing the presaturant;

j.) introducing a third ligand solution to the third column;

k.) establishing a third pure Nd band and a pure Pr band in the third column;)

l.) eluting the respective pure Nd bands to recover Nd;

m.) eluting the pure Dy band to recover Dy; and n.) eluting the pure Pr band to recover Pr.

2. The method of claim 1 wherein the second column and third column are unitary and the second and third ligand are identical, and wherein step h) occurs in a first zone of the unitary column and wherein step k occurs within a second, zone in the column.

3. The method of claim 1, wherein step a) comprises the steps:

a1) converting a the waste magnet into a mixture of soluble metallic salts;

a2) dissolving the mixture of soluble metallic salts to yield the solution containing Nd, Pr, and Dy.

4. The method of claim 1 wherein the each of the first, the second, and the third ligand is EDTA and wherein the presaturant is a $Cu^{2+}$ solution.

5. The method of claim 1 wherein the three bands define a constant pattern isotachic train.

6. The method of claim 1 wherein the presaturant is selected from the group consisting of sodium, copper, erbium, and combinations thereof.

7. The method of claim 1 and further comprising, after k) and before l), introducing a displacer into the first, second, and third column.

8. The method of claim 1 wherein the first, second, and third ligands are EDTA.

9. The method of claim 1 wherein the first ligand is moving through the first column, the second ligand is moving through the second column, and the third ligand is moving through the third column.

* * * * *